US005576783A

United States Patent [19]
Lee

[11] Patent Number: 5,576,783
[45] Date of Patent: Nov. 19, 1996

[54] RECORDING AND REPRODUCING A 3-DIMENSIONAL IMAGE

[76] Inventor: Sung Lee, 11-1, 788-15, Mora-Dong, Buk-Ku, Pusan, Rep. of Korea

[21] Appl. No.: 327,395

[22] Filed: Oct. 21, 1994

Related U.S. Application Data

[63] Continuation of Ser. No. 843,999, Feb. 19, 1992, abandoned.

[30] Foreign Application Priority Data

| Jun. 12, 1991 | [KR] | Rep. of Korea | 91-9634 |
| Aug. 8, 1991 | [KR] | Rep. of Korea | 91-13676 |
| Sep. 4, 1991 | [KR] | Rep. of Korea | 91-15393 |
| Nov. 4, 1991 | [KR] | Rep. of Korea | 91-19481 |

[51] Int. Cl.$^6$ .................................................. G03B 35/00
[52] U.S. Cl. .................................................... 396/322
[58] Field of Search .................................... 354/110, 112, 354/114, 115, 120; 352/57, 60

[56] References Cited

U.S. PATENT DOCUMENTS

| 1,905,716 | 4/1933 | Ives | 354/115 |
| 2,207,483 | 7/1940 | Hennicke et al. | 354/114 |
| 2,931,855 | 4/1960 | Abramson | 358/3 |
| 3,613,539 | 10/1971 | Dudley | 354/112 |
| 3,683,773 | 8/1972 | Dudley | 354/112 |
| 3,731,606 | 5/1973 | Geoffray | 354/112 |
| 3,769,889 | 11/1973 | Wechsler | 354/115 |
| 4,017,166 | 4/1977 | Kent | 352/57 |
| 4,125,849 | 11/1978 | Law | 354/112 |
| 4,234,894 | 11/1980 | Tokumaru | 358/250 |
| 4,541,007 | 9/1985 | Nagata | 358/3 |
| 4,575,207 | 3/1986 | August | 354/112 |
| 4,677,468 | 6/1987 | Morishita | 358/88 |
| 4,737,840 | 4/1988 | Morishita | 358/3 |
| 4,823,156 | 4/1989 | Shrader | 354/115 |
| 4,872,750 | 10/1989 | Morishita | 353/7 |

FOREIGN PATENT DOCUMENTS

| 0151331 | 8/1985 | European Pat. Off. . |
| 2506471 | 11/1982 | France . |
| 2547432 | 12/1984 | France . |
| 837250 | 4/1952 | Germany . |
| 2046210 | 3/1972 | Germany . |
| 60-31128 | 2/1985 | Japan . |
| 60-31387 | 2/1985 | Japan . |
| 60-31127 | 2/1985 | Japan . |
| 60-85489 | 5/1985 | Japan . |
| 60-102086 | 6/1985 | Japan . |
| 60-149295 | 8/1985 | Japan . |
| 60-149294 | 8/1985 | Japan . |
| 62-38695 | 2/1987 | Japan . |
| 64-41392 | 2/1989 | Japan . |
| 64-31273 | 2/1989 | Japan . |
| 64-47192 | 2/1989 | Japan . |
| 64-72690 | 3/1989 | Japan . |
| 1-205120 | 8/1989 | Japan . |
| 1-281892 | 11/1989 | Japan . |
| 1-321568 | 12/1989 | Japan . |
| 2-39690 | 2/1990 | Japan . |
| 2-162893 | 6/1990 | Japan . |
| 2-250591 | 10/1990 | Japan . |
| 8202921 | 2/1984 | Netherlands . |
| 83-8193 | 11/1981 | Rep. of Korea . |
| 1403783 | 8/1975 | United Kingdom . |
| 90/13981 | 11/1990 | WIPO . |

Primary Examiner—Michael L. Gellner
Assistant Examiner—Eddie C. Lee
Attorney, Agent, or Firm—Klarquist Sparkman Campbell Leigh & Whinston

[57] ABSTRACT

The present invention is an apparatus and method for resolving 3-dimensional optical information, in recording 3-dimensional image information. The apparatus includes, from the object side, a light shielder with left and right transparent shielder portions which are arranged vertical to the ground surface, an optical system through which the optical information is collimated, and a multiple slit grating having opaque portions and number y transparent grating portions defining a Fresnel zone behind the grating. The transparent grating portions are arranged vertical to the ground surface and resolves the image information into a number 2y of 3-dimensional image information $r_1$, $r_2$, $r_3$ ... $r_y$, $l_1$, $l_2$, $l_3$ ... $l_y$. The apparatus further includes an image plane positioned within the Fresnel zone behind the multiple slit grating on which an image without deficit or overlap is produced with a sequence of $l_1$, $r_1$, $l_2$, $r_2$ ... $l_y$, $r_y$.

14 Claims, 33 Drawing Sheets

FIG. 3
PRIOR ART
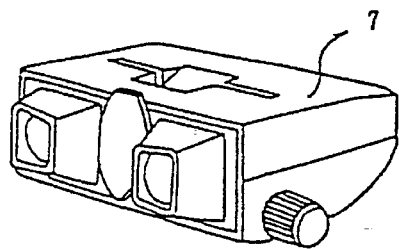
FIG. 4
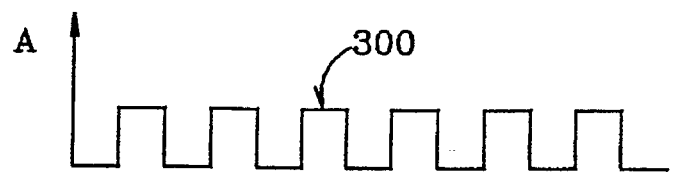
FIG. 5
FIG. 6
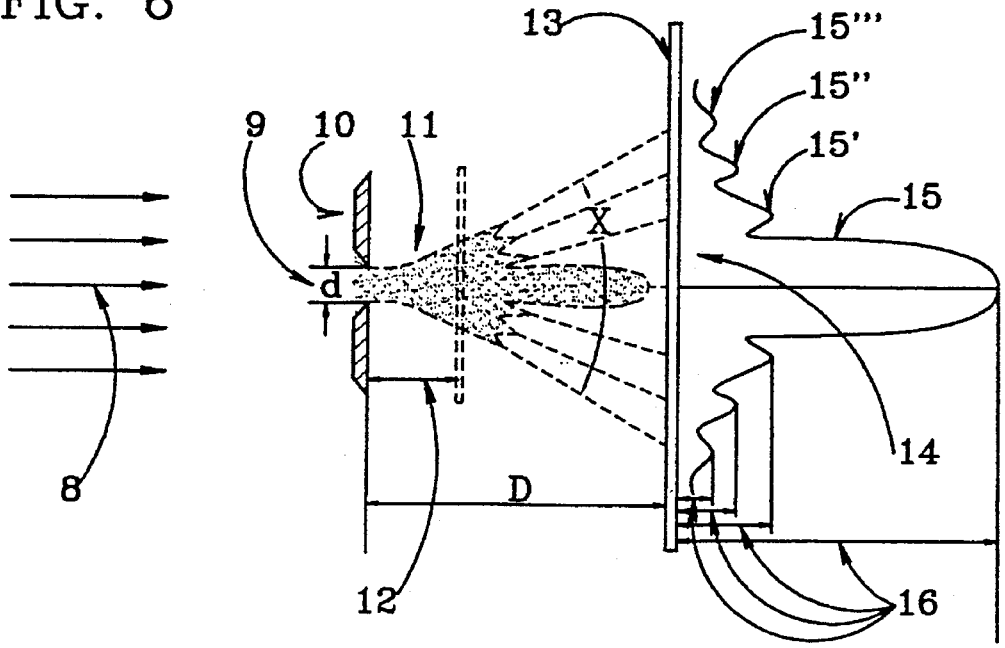

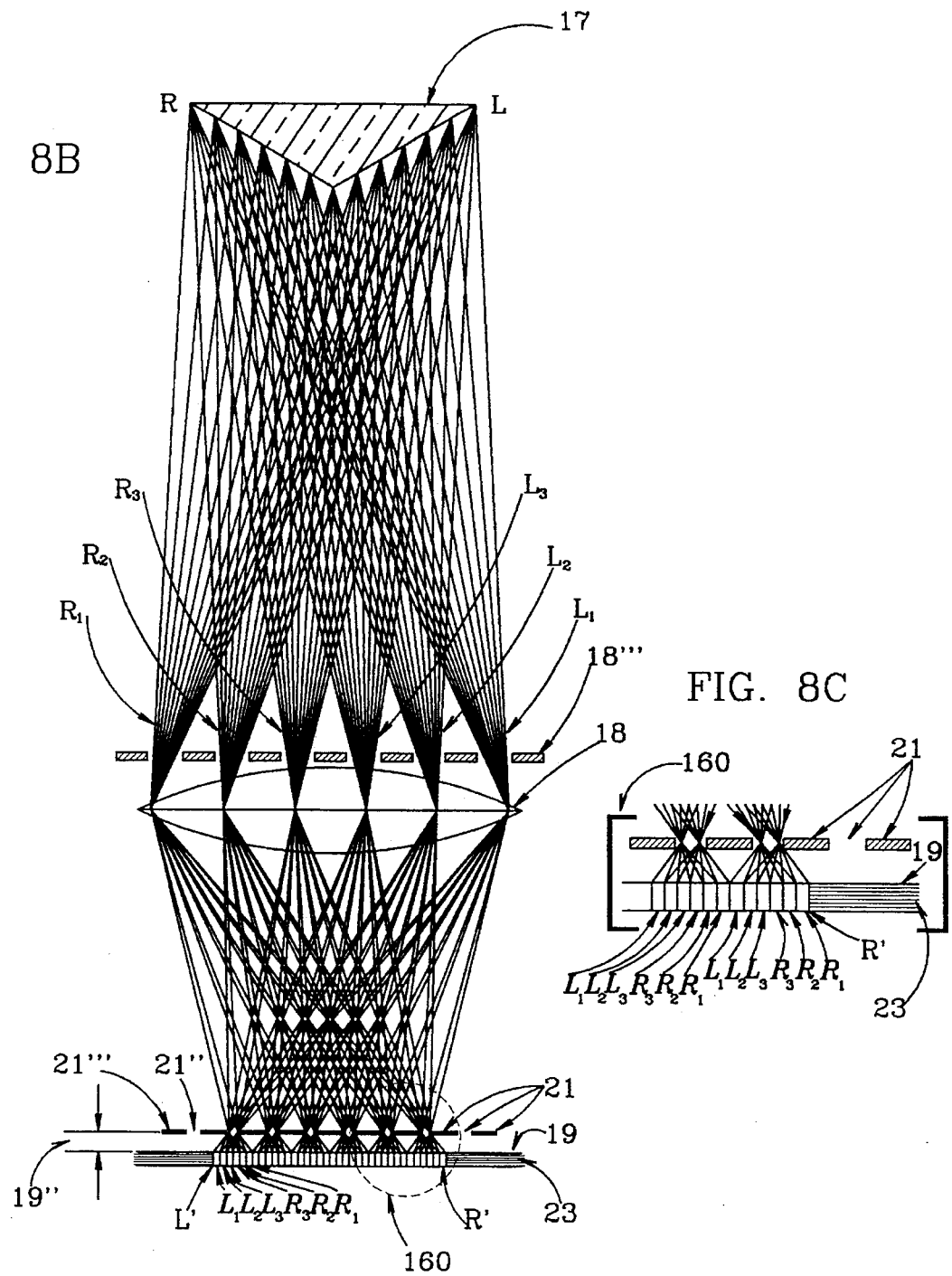

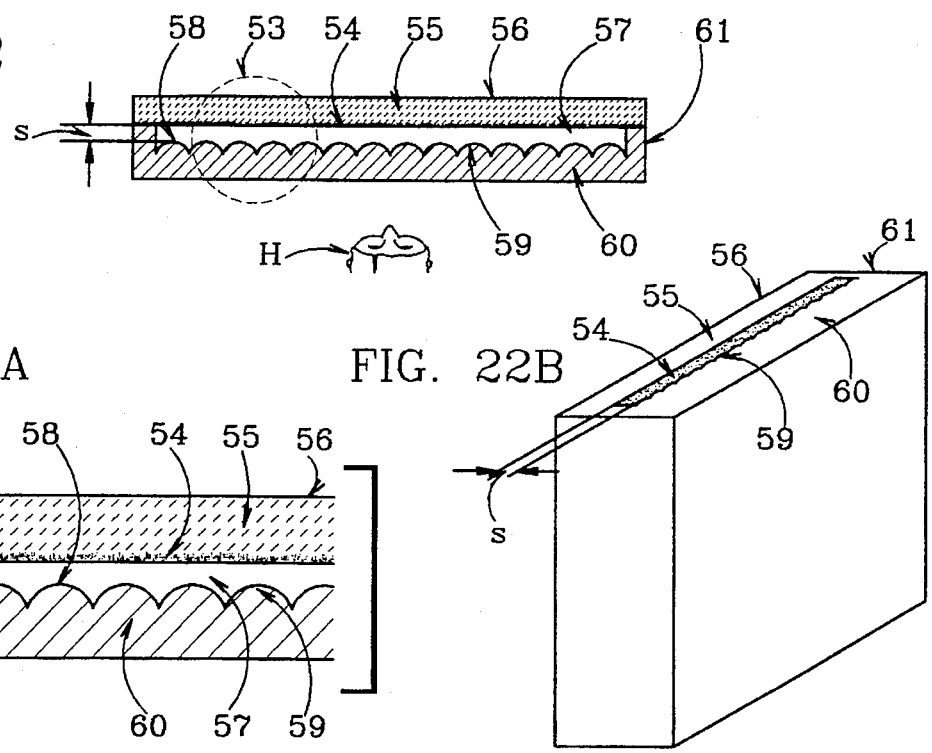
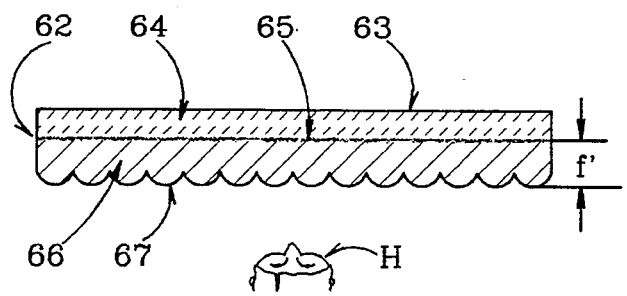
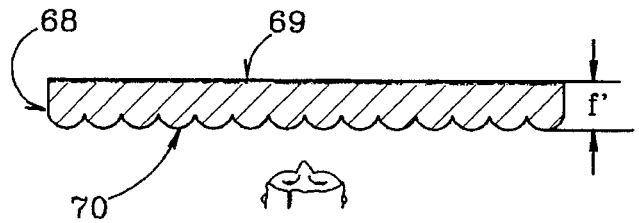

FIG. 54
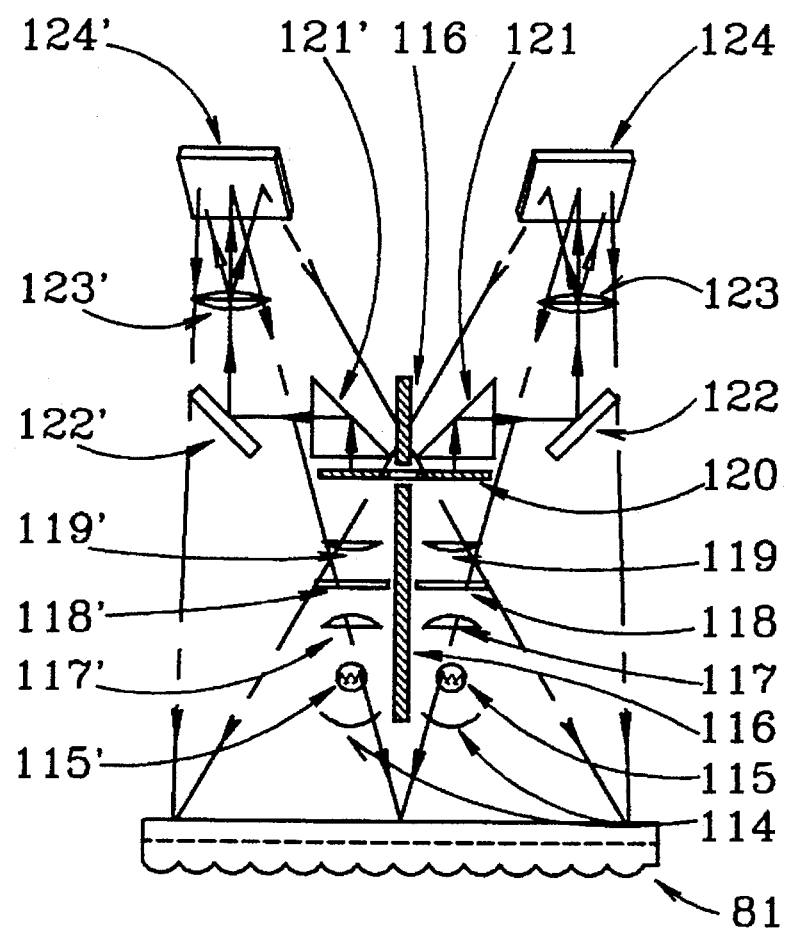
 H

FIG. 57
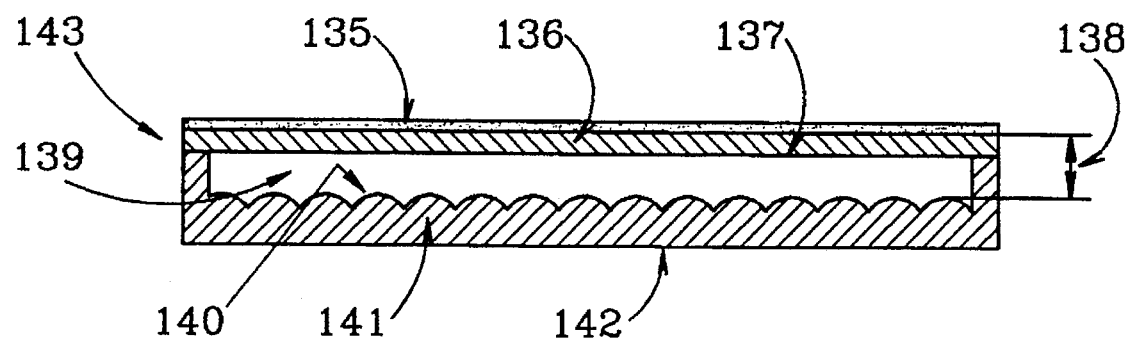
 H

RECORDING AND REPRODUCING A 3-DIMENSIONAL IMAGE

This is a continuation, of application Ser. No. 07/843,999, filed Feb. 19, 1992, now abandoned.

BACKGROUND OF INVENTION

1. Field of the Invention

The invention relates to a 3-dimensional image, and more particularly, to a method, device and various instruments for making a 3-dimensional image for a purpose of realization of not a picture to present a 2-dimensional image but a picture to present a 3-dimensional image, in a picture of photography, movie, overhead projector, television and video.

2. Information Disclosure Statement

Generally, in the prior art, to realize a 3-dimensional image, there is a way of seeing a 3-dimensional image in which an image is projected by two projectors which are equipped with polarizing filters which passes only a longitudinally or transversely polarized light and men see the image wearing glasses applied with polarizing filters, and there is also a holography which utilizes laser beam as a way of realizing a complete 3-dimensional image. However, the holography is a technique which takes a photograph by utilizing a spatial coherent nature of monochromatic light, and the holography makes it possible to record and reproduce a 3-dimensional image for an object in stationary condition, and makes it also possible to observe the 3-dimensional image only in a limited range of optical pathway through which an objective wave of interfering light travels, but makes it impossible to take a photograph of a moving object. Furthermore, even for an object in stationary condition, taking a photograph is possible only in an ideal condition in which no vibration of the object exists. As a further prior art method of realizing the 3-dimensional image, there is a method of composing the 3-dimensional image by viewing through a stereo view a stereo photograph composed of two pieces of films photographed by utilizing a stereo camera or a camera equipped with a stereo photographic adaptor which has two incident portions of light in the left-right direction with a spacing of about 6–7 cm between the two incident portions of light as shown in FIG. 1.

For prior art, there are Japanese laid-open patent publication No. Sho 64-72690, 64-47192, 60-85489, 60-102086 and Hei 1-281892, 1-205120, and U.S. patent application No. 4,017,166, and they all utilizes an optical nature of a polarized light which makes it possible to obtain a 3-dimensional image only by observing with glasses applied with polarizing filter, however, in the present invention, it is possible to observe a 3-dimensional image with naked eye and it is also possible to observe the 3-dimensional image by utilizing an optical nature of a polarized light.

Japanese laid-open patent publication No. Sho 64-41392, 64-31273, and Hei 1-321568 and 2-39690 are composed of complicated mechanical and electronic techniques to revive a 3-dimensional image and it is not easy to practice them, however, in the present invention, it is easy to practice it because it utilizes optical basic principles in recording and reproducing the 3-dimensional image.

Japanese laid-open patent publication No. Hei 2-162893 provides a method of producing an image to be observed in an image chamber which contains recording fluorescent particles by utilizing a laser beam source, and Japanese laid-open patent publication No. Hei 2-250591 utilizes a holography method which utilizes a laser beam of the spatial coherent nature, and with these method, a special light source of laser beam is required and it is almost impossible to take a photograph of a wide land scope or a moving object with the present status of art, and furthermore, even in case of an indoor photographing, a laser beam of high output power is required so that there may be a danger of losing eyesight of a man due to a damage to a retina of an eye of a man in case of photographing a man.

U.S. patent application No. 4,125,849 relates to a method of taking a photograph which bears a 3-dimensional optical information on a film at the back of a lenticular screen by passing an optical information of a subject collimated through an optical system to the lenticular screen composed of cylindrical lenses.

As described above, it is practically very difficult to obtain a clean and definite 3-dimensional photograph due to a deficit of an optical information in an image produced on a film in case of using the lenticular screen. However, in the present invention, it is possible to record and reproduce a clean 3-dimensional image simply and effectively by utilizing an optical basic principles of a light without utilizing a laser beam or a polarizing filter.

SUMMARY OF THE INVENTION

Recording and reproducing a 3-dimensional image of the present invention is defined by the claims with a specific embodiment shown in the attached drawings. For the purpose of summarizing the invention, the invention is composed of a group of inventions for making a 3-dimensional image, however, the concept of them can be classified mainly into three forms as follows:

First, a method of recording and reproducing a 3-dimensional image by recording optical informations of right image r and left image l taken of a subject changing an optic angle in a picture in a frame of a film without a simultaneous overlap of the left and right 3-dimensional optical informations so that they can be alternately arranged, and after that, by revival into a 3-dimensional image utilizing the film;

Second, a method of reviving a 3-dimensional image by projecting each independent images of right image r and left image l of a subject, photographed as divided into left and right in a film of a frame with an optic angle varied, to a screen so that the images consist with each other, and by reviving the images into a 3-dimensional image;

Third, a method of reviving a 3-dimensional image by projecting four images, that is, two left images $l_2$, $l_1$ and two right images $r_1$, $r_2$, or more independent images of the subject, photographed by installing two or more even number of television cameras with a certain spacing between the cameras in the left-right direction with the subject as a center, to a screen so that the images consist with each other, and by reviving the images into a 3-dimensional image.

Reviewing the films in which the 3-dimensional optical information for revival of the 3-dimensional image is recorded, in the first case, because the right image r and the left image l are recorded simultaneously in a picture, only one picture can be seen in one frame, however, in the second case, because the right image r and the left image l are transversely divided into two independent images, and in the third case, because the image of the subject is photographed by installing two or more even number of television cameras with a certain spacing between the cameras in the left-right direction with the subject as a center, it is possible to obtain as many independent images as the television cameras installed in the left-right direction with the subject as a center. When the 3-dimensional optical informations recorded as in the three cases described above are projected onto a 3-dimensional image revival screen to revive the 3-dimensional images, the three cases are all revived into the 3-dimensional images, that is, the right eye can recognize the optical information of the right image and the left eye can recognize the optical information of the left image so that the observer can see the 3-dimensional images.

Describing the present invention in more detail, first, in case of a 3-dimensional photograph, an optical information emitted by a subject is collimated through a camera lens, and the collimated optical information is resolved into 3-dimensional optical informations composed of two components, that is right image and left image, when the collimated optical information passes through an equal width multiple slit grating which has a transparent portion and an opaque portion of same width arranged vertical to the ground behind the lens, and then the 3-dimensional optical information resolved into the two components is alternately arranged without a deficit or overlap on a negative film located at an image plane located with a certain spacing behind an equal width multiple slit grating, which has a transparent portion and an opaque portion of same width arranged vertical to the ground, so that image having a 3-dimensional optical information is produced on the negative film, and when the image carrying a 3-dimensional optical information produced on the film is printed a photograph carrying a 3-dimensional optical information is resulted.

Second, in case of a 3-dimensional movie, an optical information emitted by a subject is collimated through a camera lens, and the collimated optical information is resolved into 3-dimensional optical informations composed of two components when the collimated optical information passes through an equal width multiple slit grating, which has a transparent portion and an opaque portion of same width arranged vertical to the ground, then an image of the subject carrying a 3-dimensional optical information without a deficit or overlap is recorded on a positive film located at an image plane having a certain spacing with the grating. If the positive film recorded with the 3-dimensional optical information as described above is projected by a projector onto the 3-dimensional image revival screen of the present invention, a 3-dimensional movie is resulted. At this time, if we see the negative film or positive film or photograph carrying a 3-dimensional optical information with naked eye in case of the 3-dimensional photograph or in case of the 3-dimensional movie, they look as if they are a film or a photograph carrying the prior art 2-dimensional optical information, however, in fact, they are carrying a 3-dimensional optical information. If the positive film carrying a 3-dimensional optical information is projected onto the 3-dimensional image revival screen of the present invention, or if we observe the photograph carrying the 3-dimensional optical information by placing a prior art lenticular screen on the photograph, we can notice that there is a 3-dimensional image on it. Among other methods of the 3-dimensional movie of the present invention, there is a method of reviving a 3-dimensional movie by resolving and projecting onto the 3-dimensional image revival screen the optical information on the positive film where the right image r and the left image l are respectively photographed as divided into left and right in a film of a frame, so that the images consist with each other.

Third, in case of realizing a 3-dimensional image through a 3-dimensional television receiver, if a face plate in an image plane of an electron scanning tube of the prior art television camera or video camera, the image plane being composed of a face plate, a nesa and a target, is replaced by an equal width multiple slit grating, which has a transparent portion and an opaque portion of same width arranged vertical to the ground, or if an equal width multiple slit grating, is installed between the face plate and the nesa of the image plane of the prior art electron scanning tube the optical information emitted by the subject is converted into an electric intensity signal capable of presenting a 3-dimensional image, and this 3-dimensional image signal of the electric intensity is again converted into a 3-dimensional image at the 3-dimensional television receiver to realize a 3-dimensional television image.

A 3-dimensional television receiver of different method resolves each of the right image r and the left image l independently, projects the resolved two images onto the 3-dimensional image revival screen, and makes the images to consist each other to revive the 3-dimensional image. The equal width multiple holographic slit grating, which has a transparent portion and an opaque portion of same width arranged vertical to the ground, can also function as an equal width multiple slit grating, which has a transparent portion and an opaque portion of same width arranged vertical to the ground as described above.

A 3-dimensional television receiver of further different method projects two images of the subject photographed by two or more even number of television cameras installed with a certain spacing between the cameras in the left-right direction with respect to the subject, that is, two left images $l_2$, $l_1$ and two right images $r_1$, $r_2$ or more independent images onto the 3-dimensional image revival screen so that the images consist with each other, reviving the 3-dimensional image. The structure of a grating formed at the 3-dimensional image revival screen used in this case is different from the equal width multiple slit grating, which has a transparent portion and an opaque portion of same width arranged vertical to the ground, or from the equal width multiple holographic slit grating, which has a transparent portion and an opaque portion of same width arranged vertical to the ground, and is constituted in such a way that the width of the transparent portion is narrower than the width of the opaque portion with a certain ratio, the reason being to image an image on a screen without a deficit of optical information from an image resolved into 3-dimensional optical information by passing many images more than four images $l_2$, $l_1$, $r_1$, $r_2$ photographed in as many directions as possible through the grating constituted in such a way that the width of the transparent portion is narrower than the width of the opaque portion with a certain ratio. If only two images divided into the right image r and the left image l are projected onto such 3-dimensional image revival screen which has as a constituting element the grating constituted in such a way that the width of the transparent portion is narrower than the width of the opaque portion with a certain ratio, a deficit of optical information is resulted on the image produced after passing through the grating. The fact that the grating is arranged vertical to the ground surface is equally applied to the equal width multiple slit grating and the equal width holographic slit grating where a transparent portion and an opaque portion are of same width, and to the unequal width multiple slit grating where the width of the transparent portion is narrower than the width of the opaque portion with a certain ratio. Various devices and methods which have not been described so far, a 3-dimensional camera, 3-dimensional television camera, 3-dimensional video camera, 3-dimensional television receiver and 3-dimensional image revival screen, etc. will be described in detail based on embodiments described later. Hereinafter for conveniences, the equal width multiple slit grating, which has a transparent portion and an opaque portion of same width arranged vertical to the ground behind the lens, is referred to as a vertical multiple slit grating, and the equal width multiple holographic slit grating, which has a transparent portion and an opaque portion of same width arranged vertical to the ground behind the lens, is also referred to as a vertical multiple holographic slit grating.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the air can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 3 is a perspective view of a prior air stereo view 7, FIG. 4 is a section and an amplitude distribution diagram 300 of a multiple slit grating 20', which has a transparent portion 100 and an opaque portion 200 of same width arranged alternately vertical to the ground, FIG. 5 is a section and an amplitude distribution diagram 400 of a multiple holographic slit grating 20", which has a transparent portion 100 and an opaque portion 200 of same width arranged alternately vertical to the ground, FIG. 6 is a schematic drawing showing a condition in which a light ray 8 is diffracted after passing a slit 9 and an amplitude distribution diagram 16 of Fraunhofer diffraction light 14.

FIG. 11-C is a section of the 3-dimensional camera 29'" of the present invention installed on its left and right side with the unequal width multiple slit gratings 21 with a certain distance in front of the image plane of the camera in which grating 21 the width of opaque portion 21'" is wider than the width of transparent portion 21" to a certain ratio, and which is arranged vertical to the ground, and also installed with the optical system 18 formed with six incident portions of light by the light shielder 18'''.

FIG. 23 is a section of a 3-dimensional image revival screen 62 of the second embodiment of the present invention, FIG. 24 is a section of a 3-dimensional image revival screen 68 of the third embodiment of the present invention, FIG. 54 is a third embodiment of the 3-dimensional movie of the present invention utilizing the 3-dimensional image revival screen 81 of the fourth embodiment of the present invention, FIG. 57 is a section of a 3-dimensional liquid crystal display television 143 of the present invention excluding electro-electronic devices.

Similar reference characters refer to similar parts throughout the several views of the drawings.

DETAILED DESCRIPTION OF THE INVENTION

Figure 1:
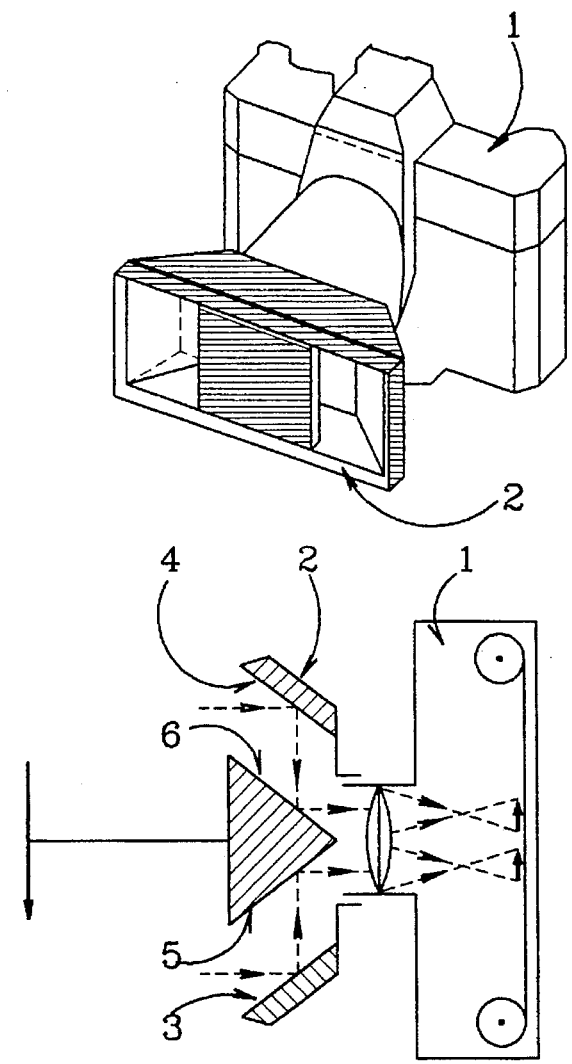
FIG. 1 is a perspective view and a section of a camera equipped with a prior art stereo photograph adaptor 2.
Figure 2:
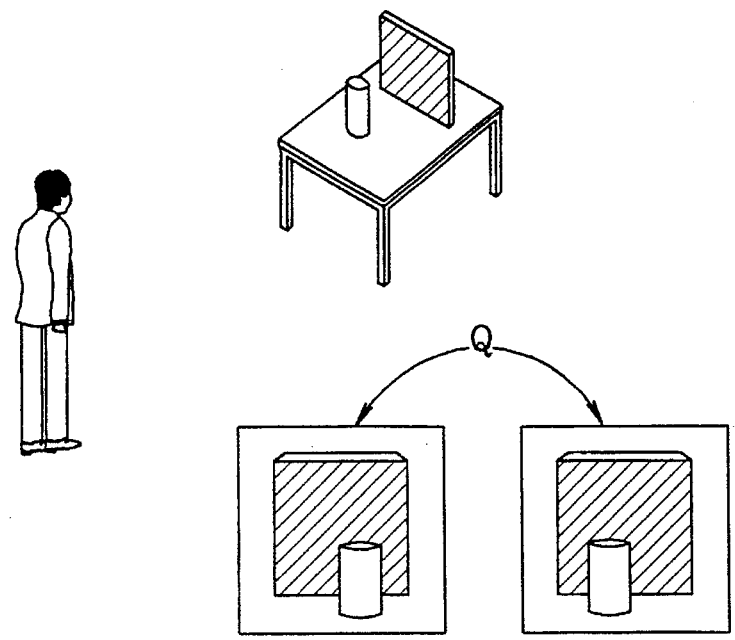
FIG. 2 is a prior art stereo photograph Q photographed of a subject by a camera equipped with a prior art stereo photograph adaptor 2 or by a stereo camera.

FIG. 1 is a generally used photo camera, in front of a photographing lens of which a stereo photograph adaptor 2 is attached, the adaptor being an accessory to make it possible to take stereo photograph. This stereo photograph adaptor is a device to photograph a stereo photograph Q which is produced in two images divided into right image and left image as shown in FIG. 2 by resolving the optical information incident to the lens into left and right by using four mirrors 3, 4, 5, 6. In general stereo photograph is made by a special stereo camera in which two photographing lenses are placed transversely side by side with a spacing of about 6 to 7 cm, so that two photographs are taken at one push of shutter. If the stereo photograph thus made is put into a prior art stereo view 7 as shown in FIG. 3, then the picture looks 3-dimensionally. Even though the 3-dimensional image can be made by the above said prior art method, there is a disadvantage in this case that two photographs of left and right are necessary and the image of the subject of which the 3-dimensional optical information is recorded in a frame can not be photographed continuously. FIGS. 4 and 5 show sections of equal width grating arranged vertical to the ground surface, which grating is used importantly as a 3-dimensional optical information resolving means, where FIG. 4 is an equal width multiple slit grating 20' arranged vertical to the ground surface, here the slits are completely transparent and the spaces between slits are completely opaque, and the width of the transparent portion 100 is equal to the width of the opaque portion 200, and FIG. 5 is an equal width multiple holographic slit grating 20" arranged vertical to the ground surface made during the process of development and settlement on the photograph dry plate, here the degree of transparency changes continuously from the transparent portion to the opaque portion without abrupt change, and the intensity of the light changes continuously from a minimum value to a maximum value, so that the result is that the amplitude 400 of the light changes according to a sine curve, and more light is collected for the zeroth order and first order diffraction waves than for the high order diffraction wave. However, the amplitude 300 of the light in the multiple slit grating 20' in FIG. 4 changes abruptly on the slit and has a constant value of amplitude.

Figure 7:
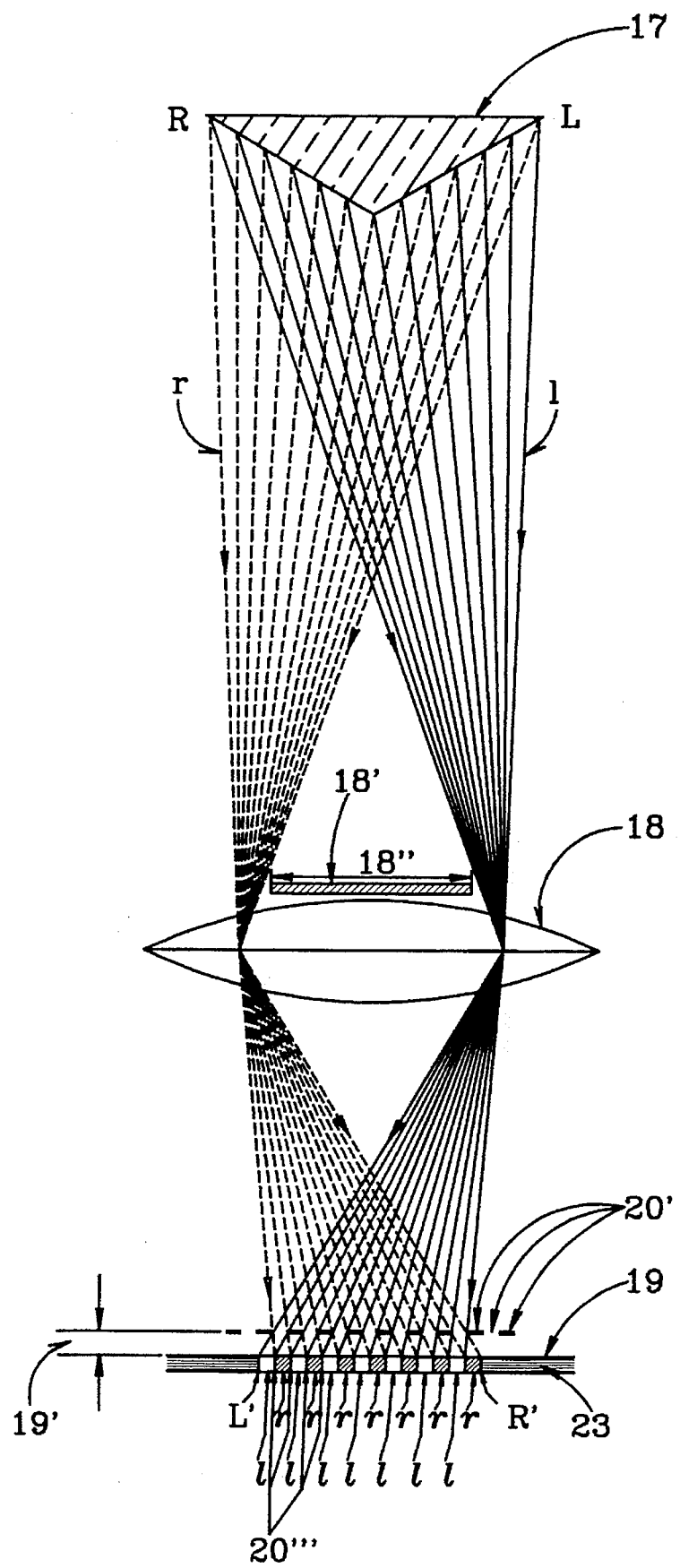
FIG. 7 illustrates a condition of an image 20 in which when a right optical information r and a left optical information l of a subject 17 collimated through an optical system 18 the center portion of which is shielded by a light shielder 18' located vertical to the ground surface are diffracted through a multiple slit grating 20', which has a transparent portion and an opaque portion of same width arranged alternately vertical to the ground, and which is a 3-dimensional optical information resolving means, and are resolved into 3-dimensional optical informations, and then brought into an image L'⇆R' of the subject 17 carrying a 3-dimensional optical information on a film 23 located at an image plane 19, the optical informations r, l are arranged alternately without an overlap or an deficit, FIG. 8-A illustrates a condition in which deficits 21' of optical information appears on the image plane 19 in case where the optical information of the subject 17 collimated through the optical system 18 formed with two incident portions of light by the light shielder 18' is passed through an unequal multiple slit grating 21 in which the width of transparent portion 21" is narrower than the width of opaque portion 21'" and is resolved into 3-dimensional optical informations, FIG. 8-B illustrates a condition in which the optical information of the subject 17 is resolved into as many 3-dimensional optical informations as the incident portions of light formed on the optical system 18 and images an image on the image plane 19 without a deficit 21' or an overlap, incase where the optical information of the subject 17 collimated through the optical system 18 formed with more than three incident portions of light by the light shielder 18'" is resolved into the 3-dimensional optical informations through the unequal width multiple slit grating 21 in which the width of opaque portion 21'" is wider than the width of transparent portion 21" to a certain ratio, FIG. 8-C is a partially enlarged view of the image plane 19 illustrated in FIG. 8-B.
Figure 8A:
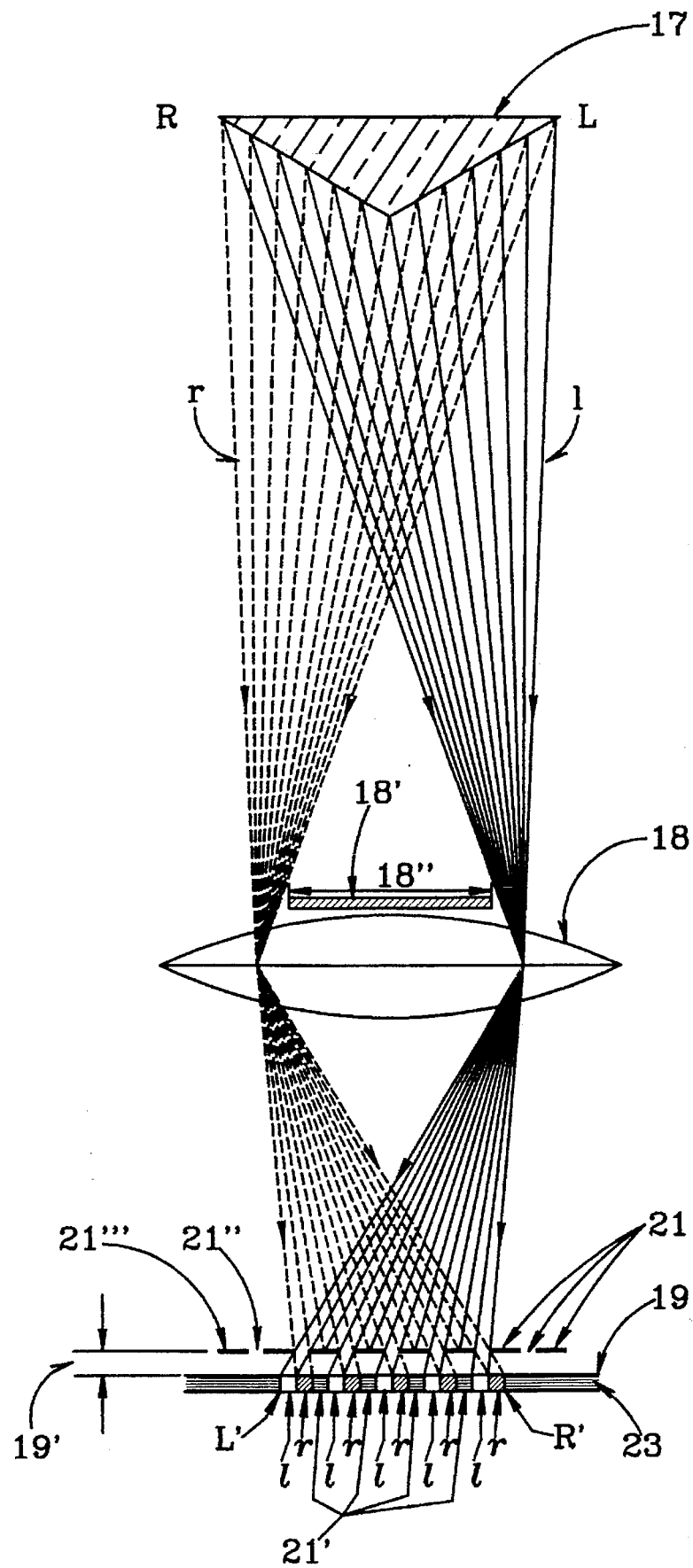

When such vertical equal width multiple slit grating 20' or vertical equal width multiple holographic slit grating 20" is placed in front of the image plane of the camera with certain distance from the image plane, the optical information of the subject collimated through the optical system of a camera is resolved into 3-dimensional optical informations so that the 3-dimensional optical informations of the subject can be recorded definitely on the film placed at the image plane. Before explaining such phenomena, if we review the general diffraction phenomena of physical optics of a beam of light 11 which passed the slit 9 as shown in FIG. 6, when the light 8 passes through a narrow transparent portion as the slit 9 of the grating, the beam of light 11 as wide as the slit 9 can be observed at a distance adjacent to the slit 9, however, as the light moves away from the slit 9 the beam of light spread wide after passing the slit 9 so that we can observe a light portion 15 of the central portion and dark portions 15', 15", 15''' of the periphery. This is the diffraction phenomena of the light after passing the slit 9, which can be expressed in terms of an amplitude 16 of the intensity of the light wave length, this means that as the light which passed the slit 9 moves away from the slit 9, the beam of light spreads wide and presents diffraction fringe equivalent to the amplitude 16. This is referred to as Fraunhofer diffraction fringe 14, and the physio-optical formula related with the Fraunhofer diffraction fringe 14 is given as $$X = m\lambda \frac{D}{d},$$

the formula implying the width X° of the beam of light spread wide when the light 8 passes the slit 9 and is diffracted, and the width is expressed as $$X° = 51 \frac{\lambda}{d}$$

when expressed in terms of the angle. Explaining in more detail, the width X° of the beam of light after passing the slit 9 is proportional to the distance D from the slit 9 to the screen 13 where the observer exists, is inversely proportional to the width d of the slit 9, and is proportional to the wavelength λ of the light which passed the slit 9. In the laboratory, to clearly observe the Fraunhofer diffraction fringe 14, the 2-dimensional wave of the monochromatic light is mainly used for the light which is to pass the slit 9. The distance from the slit 9 to the position where the Fraunhofer diffraction fringe 14 starts to appear is given as $2d^2/\lambda$. The most light portion at the center of the Fraunhofer diffraction fringe 14 which the light 8 makes on the screen 13 after the light passes the slit 9 and spreads is zeroth order wave 15, and there the amplitude 16 becomes maximum. As the light spreads to the periphery, the first order 15', the second order 15" and the third order 15''', etc. wave occur and the brightness and the amplitude 16 are reduced little by little, the second order 15", the third order 15''', etc. diffraction wave are called high order diffraction wave. There is a Fresnel zone 12 where the beam 11 of light as wide as the slit 9 can be obtained because the light does not spread after passing the slit 9 as shown in FIG. 6, and in the Fresnel zone the above said high order diffraction wave do not appear, and the beam of light in that zone may be regarded as being collimated. Beyond the Fresnel zone 12, the Fraunhofer diffraction fringe 14 where the high order 15', 15", 15''' diffraction waves exist starts to appear. FIG. 7 is a section showing the condition where the optical informations r, l of the subject 17 collimated through the optical system 18 of a camera which has 2 incident portions of light and which is shielded at its center by a light shielder 18' located vertical to the ground surface pass the vertical equal width multiple slit grating 20' or equal width holographic slit grating 20" located in front of the image plane 19 of the camera with certain distance to the image plane 19 and are resolved into the 3-dimensional optical informations, so that the image L'←—→R' of the subject 17 carrying the 3-dimensional optical informations l, r is recorded on the film 23 located at the image plane 19 without a deficit or overlap of the optical information. This means that the image L'←—→R' of the subject 17 carrying the 3-dimensional optical informations l, r is recorded on the film 23 located at the image plane 19 without a deficit or overlap of the optical information in accordance with the purpose of the present invention. To obtain the result as described above, the equal width multiple slit grating 20' arranged vertical to the ground surface or the equal width multiple holographic slit grating 20" arranged vertical to the ground surface must be necessarily used, and the distance 19' between such gratings and the image plane 19 where the film 23 is located must be always kept constant within the Fresnel zone. It is because, as described in FIG. 6, the definite 3-dimensional optical information collimated with the width d of the slit 9 without the high order diffraction wave can be obtained only in the range adjacent the Fresnel zone from the slit 9, and furthermore, only when the transparent portion 100 and the opaque portion 200 of the vertical equal width multiple slit grating 20' or the vertical equal width multiple holographic slit grating 20" have the same width and the same spacing as shown in FIG. 4 and 5, it is possible to record definitely an image L'←—→R' of the subject 17 carrying the 3-dimensional optical information l, r without a deficit or overlap of the optical information on the film located at the image plane 19 as shown in FIG. 7. Furthermore, to be able to resolve the image into the transverse 3-dimensional optical information which can revive the transverse parallax effect and the 3-dimensional feeling adapted to the human eyes located transversely being apart about 6.3 to 6.5 cm from each other, it is inevitably essential that the vertical equal width multiple slit grating 20' or the vertical equal width multiple holographic slit grating 20" is arranged vertical to the ground surface and also the light shielder 18' which shields the center portion of the optical system 18 of the camera is arranged vertical to the ground surface. To obtain the transverse 3-dimensional optical information adapted to the human eyes which are apart transversely about 6.3 to 6.5 cm from each other, the width 18" of the light shielder 18' which shields the central portion of the optical system 18 of camera must be about 6.3 to 6.5 cm, however, because in most cases the diameter of the camera lens is not more than 6.3 to 6.5 cm it is necessary to fit the stereo photograph adaptor 29 of the present invention to be explained in FIG. 11-A in front of the optical system 18 of camera, and in this case the light shielder 18' is not necessary. When the vertical equal width multiple slit grating 20' or the vertical equal width multiple holographic slit grating 20" is placed with constant distance from the image plane in the Fresnel zone in front of the image plane of the general portable camera, the movie photographer, the television camera, or the video camera, it must be placed vertical to the ground surface without fail. FIG. 8-A is a section showing the function of the vertical unequal width multiple slit grating 21, in which the width of the opaque portion 21 is wider than the width of the transparent portion 21" and which is placed between the image plane 19 and the optical system 18 having two incident holes of light formed by a light shielder 18' placed vertical to the ground surface in the front of the middle of the optical system 18 where the deficit portion 21' of the optical information is resulted in the image recorded on the film 23 located at the image plane 19. It is because the optical information is too much shielded by the opaque portion 21''' due to the fact that the width of the opaque portion 21''' is wider than the width of the transparent portion 21", and also because the amount of the optical information collimated through the incident holes of light is little as the optical information emitted from the subject enters through only two incident holes of light. In this case, if it is desired to remove the deficit portion 21' of the optical information from the image L'←—→R' recorded at the image plane 19, the distance between the image plane 19 and the unequal width grating must be larger than the certain distance 19' between the image plane 19 and the vertical equal slit grating 20' in FIG. 7, however, in this case the high order diffraction wave such as Fraunhofer diffraction which is diffracted in the different directions according to various light wave length contained in the beam of light which passed the slit by the diffraction function inherent to the slit grating occurs, so that the chaos in the color of the image recorded at the image plane is caused and accordingly the definite image is not obtained. However, in the case where the unequal width multiple slit grating 21 in which the width of the opaque portion 21''' is wider than the width of the transparent portion 21" is placed between the optical system 18 and the image plane 19, if it is desired to record an definite image resolved into the 3-dimensional optical informations on the film 23 located at the image plane 19 without the deficit portion 21' or the overlap, it is needed to form in the immediate front of the optical system 18 a light shielder of the same structure as grating, in which the equal width opaque portion and transparent portion are alternately arranged, and which form more than 3 incident holes of light at the optical system 18, with shielder vertical to the ground surface, so as to increase the amount of the optical information of the subject collimated through the optical system formed with the plurality of the incident holes of light more than 3. As an example, FIG. 8-B shows a condition in which six optical informations $R_1$, $R_2$, $R_3$, $L_3$, $L_2$, $L_1$ of the subject 17 passing through six incident portions of light formed by (i.e. transparent portions defined in) a light shielder 18''' installed in immediate front of the optical system 18 are collimated through the optical system 18, and the collimated six optical informations are again resolved into six 3-dimensional optical informations $L_1$, $L_2$, $L_3$, $R_3$, $R_2$, $R_1$ of the same number as six incident potions of light formed at the optical system 18 through an unequal width multiple slit grating 21 which is installed between the optical system 18 and the image plane 19 and in which the width 21''' of opaque portion is wider than the width 21" of transparent portion to a certain ratio, and then an image is produced and recorded on the film 23 placed at the image plane 19 without a deficit or an overlap. FIG. 8-C is a partially enlarged view of a condition in which the six 3-dimensional optical informations $L_1$, $L_2$, $L_3$, $R_3$, $R_2$, $R_1$ illustrated in FIG. 8-B images an image on the film 23 placed at the image plane 19 without deficit or overlap of optical information, and then the image is recorded. At this time, the width of the opaque portion 21''' becomes wider than the width of the transparent portion 21" with a certain ratio in the vertical unequal width multiple slit grating 21, in which the width of the opaque portion 21'" is wider than the width of the transparent portion 21" and which is placed directly in front of the image plane, depending on the number of incident holes of light formed at the optical system 18, and also the distance between the vertical unequal multiple slit grating 21 and the image plane at which the film on which the image resolved into the 3-dimensional optical information is recorded is placed is a little bit varied. That is, if the number of the incident holes of light formed in front of the optical system 18 is increased to more than 3, then the width of the opaque potion 21'" becomes wider than the width of the transparent portion 21" in the vertical unequal width multiple slit grating 21 installed directly in front of the image plane, also the distance between the vertical unequal width multiple slit grating 21 and the image plane at which the film on which the image resolved into the 3-dimensional optical information is recorded is placed is a little bit increased, in addition, the number of the images resolved into the 3-dimensional optical informations becomes equal to the number of the incident holes of light formed at the optical system 18 as explained in FIG. 8-B. If the light shielder of the same structure as grating, which has equal width opaque portion and transparent portion, and which form more than 3 incident holes of light at the optical system 18, is differentiated into infinity ∞, then the number of incident holes of light formed at the optical system 18 is increased to infinity ∞ resulting in an optical system 18 in which the existence of the light shielder may be neglected. Therefore, if the ratio of the width of opaque portion 21'" to the width of transparent portion 21" of the unequal width multiple slit grating 21 installed vertical to the ground surface in front of the image plane and the distance between the vertical unequal width multiple slit grating 21 and the image plane at which the image resolved into the 3-dimensional optical information is recorded are kept constant, then the countless images resolved into transverse 3-dimensional optical information are recorded at the image plane within a receptable range of optical system 18 for the optical information emitted from the subject.

Figure 9:
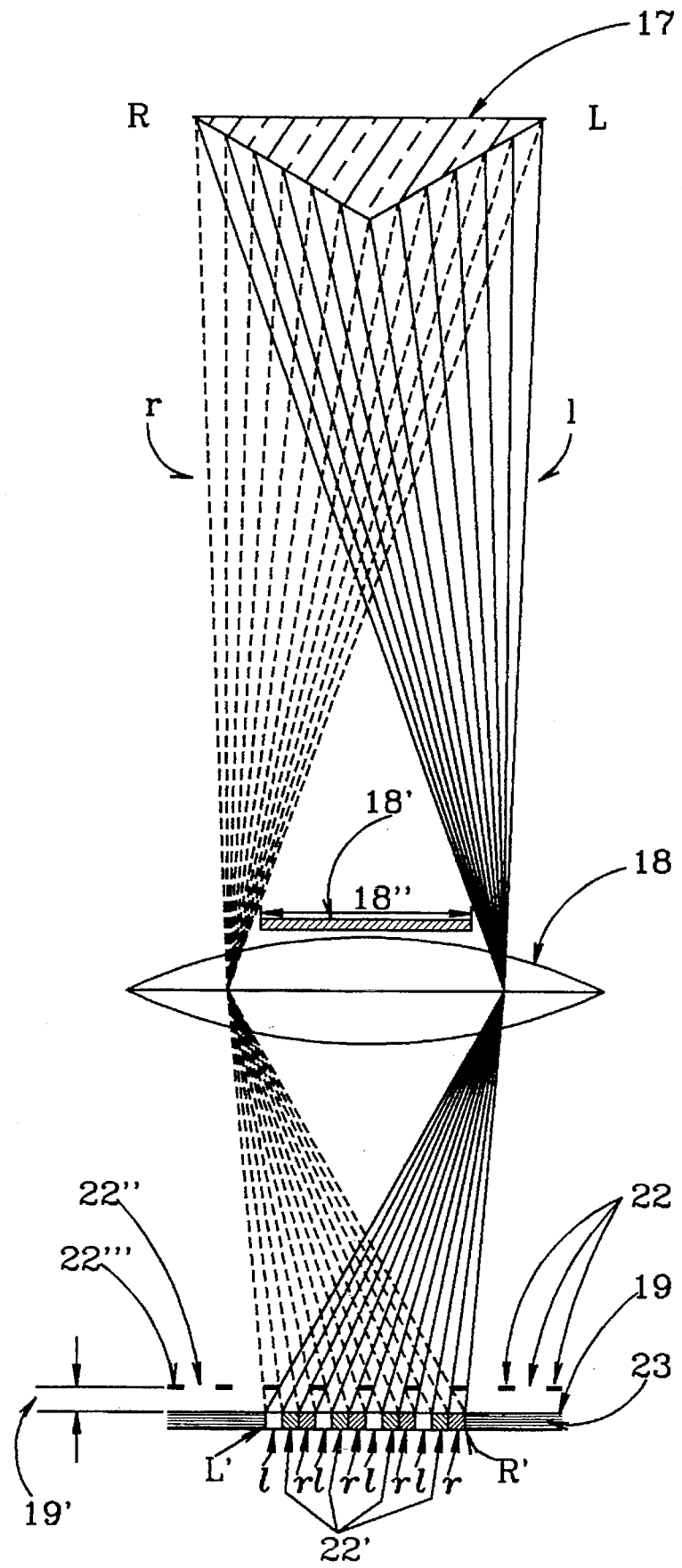
FIG. 9 illustrates a condition in which overlaps 22' of optical information appears on the image plane 19 in case where the optical information of the subject 17 collimated through the optical system 18 formed with two incident portions of light by the light shielder 18' is passed through an unequal multiple slit grating 22 in which the width of transparent portion 22" is wider than the width of opaque portion 22'" and is resolved into 3-dimensional optical informations.

FIG. 9 shows a condition in which the unequal width multiple slit grating 22 in which the width of the transparent portion 22" is wider than the width of the opaque portion 22'", where the portion 22' in which the optical informations are overlapped appears at the image L'←—→R' imaged at the image plane 19, and eventually the overlapped portion 22' results in a usual 2-dimensional photograph not resolved into the 3-dimensional optical information due to the occurrence of the overlapped portion 22' of those optical informations. This phenomenon appears because the width of the opaque portion is narrower than the width of transparent portion of the unequal width multiple slit grating 22, and it is impossible to revive the 3-dimensional image by using such film.

Figure 10:
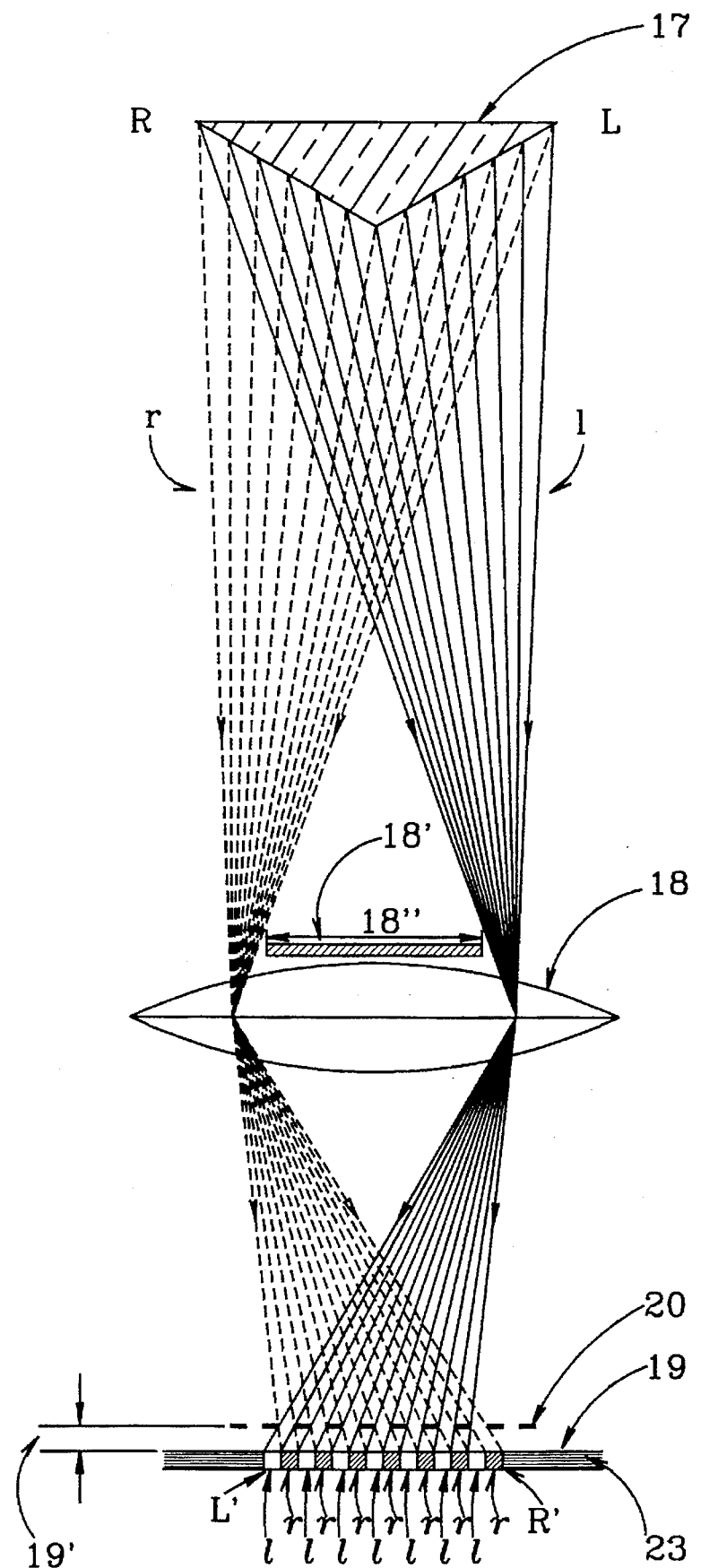
FIG. 10 illustrates a condition of an image in which when a right optical information r and a left optical information l of a subject 17 collimated through an optical system 18 the center portion of which is shielded by a light shielder 18' located vertical to the ground surface are diffracted through a multiple slit grating 20', which has a transparent portion and an opaque portion of same width arranged alternately vertical to the ground, and which is a 3-dimensional optical information resolving means, and are resolved into 3-dimensional optical informations, and then brought into an image L'←→R' of the subject 17 carrying a 3-dimensional optical information on a film 23 located at an image plane 19, the optical informations r, l are arranged alternately without an overlap or an deficit, FIG. 11-A illustrates a condition in which an image 28' of a subject 28 is imaged on the film 23 placed at the image plane of the camera 29' when a stereo photograph adaptor 29 of the present invention modified to apply the prior art stereo photograph adapter 2 to the present invention is fitted on the 3-dimensional camera 29' of the present invention installed with the multiple slit grating 20' with a certain distance in front of the image plane of the camera in which grating 20' the transparent portion and the opaque portion of the same width are alternately arranged vertical to the ground.
Figure 11A:
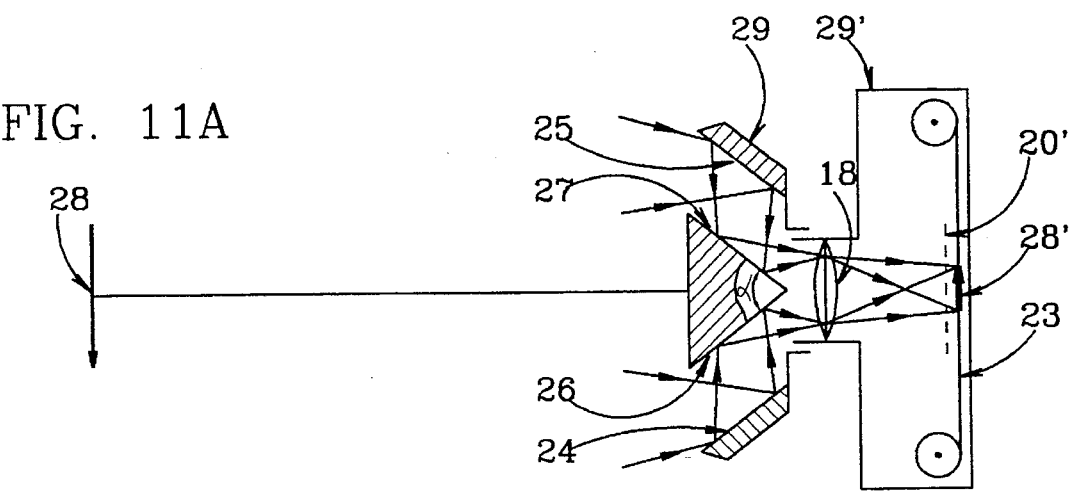
FIG. 11-B is a section of the 3-dimensional camera 29" of the present invention installed on its left and right side with the multiple slit gratings 20' with a certain distance in front of the image plane of the camera in which grating 20' the transparent portion and the opaque portion of the same width are alternately arranged vertical to the ground, and also installed with the optical system 18 formed with two incident portions of light by the light shielder 18'.
Figure 11B:
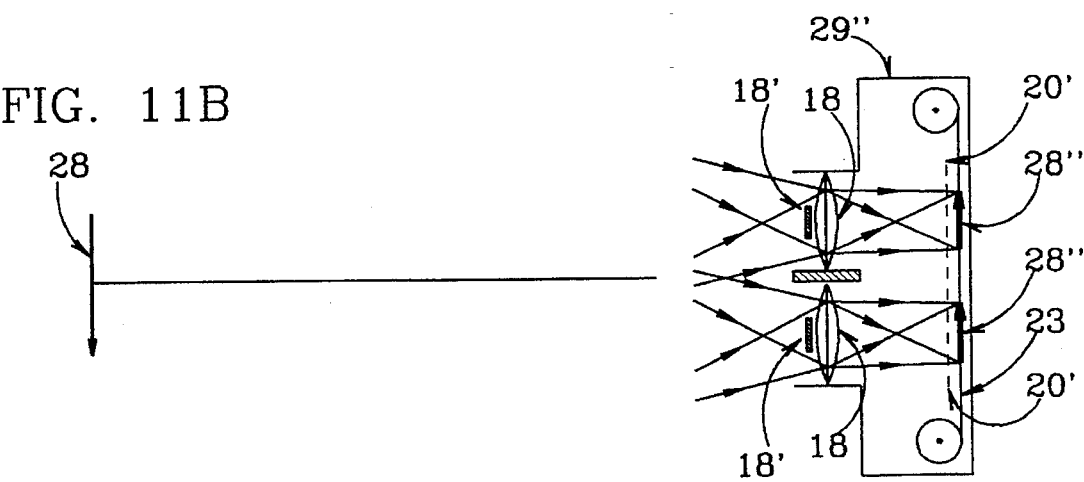
Figure 11C:
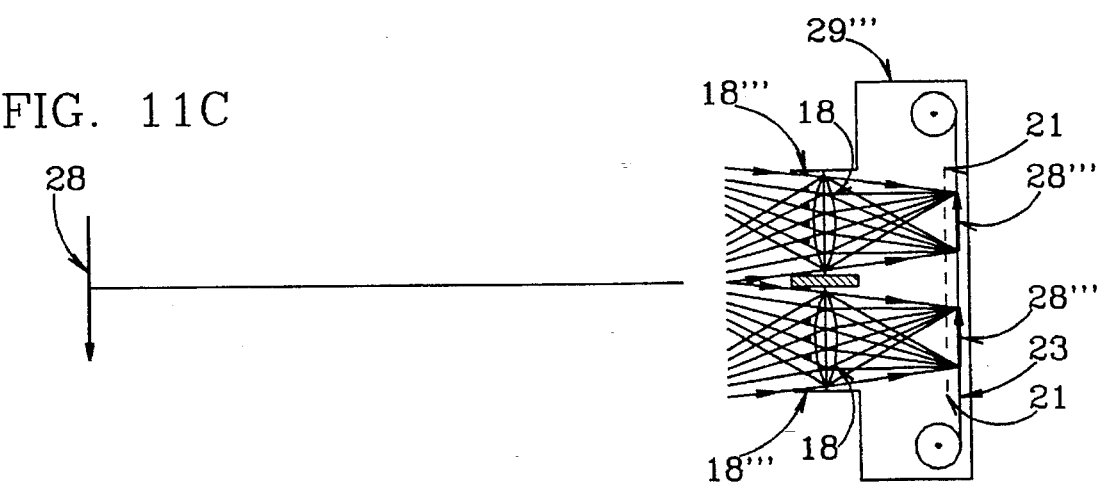

FIG. 10 shows the structure of the 3-dimensional camera of an embodiment of the present invention, where the camera is consisted of the optical system 18, the light shielder 18' fitted at the central portion of the lens optical system 18 when the diameter of the camera lens is larger than 6.3–6.5 cm, the resolving means 20 resolving the 3-dimensional optical information to realize the 3-dimensional image, and the image plane with a certain distance apart behind the 3-dimensional optical information resolving means 20, at which image plane the film is placed. If a photograph is taken by a 3-dimensional camera constructed as above, the optical information r, l of the subject 17 collimated through the optical system 18 is resolved into two components of 3-dimensional optical information r, l collimated as wide as the slit through the equal width multiple slit grating 20' arranged vertical to the ground surface, the grating 20' being a 3-dimensional optical information resolving means 20, and then the optical information r, l is recorded as an image on the film 23 located at the image plane 19, so that a film recorded with 3-dimensional optical information can be obtained with only one sheet of picture. At this time, if the photographing is continuously performed with the positive film and the photograph is projected to the 3-dimensional image revival screen 61, 62, and 68 of the present invention shown in FIG. 22, FIG. 23 or FIG. 24 by using the known projector, then a surprising phenomenon can be observed, that is a 3-dimensional image, and it is because of the function of the vertical equal width multiple slit grating 20' or the vertical equal width multiple holographic slit grating 20" shown in FIG. 4 and FIG. 5. A description about the vertical equal width multiple slit grating 20' is now given with reference to the FIG. 10. FIG. 10 shows the condition in which when the optical informations r, l emitted by the subject 17 pass the optical system 18, are collimated and pass again the vertical equal width multiple slit grating 20', the optical informations r, l are converted to the 3-dimensional optical information r, l resolved into two kinds, that is right and left informations, and then recorded alternately without the deficit or overlap of optical information on the film 23 located at the image plane 19 apart a certain distance 19' backward from the vertical equal width multiple slit grating 20'. The face that the two, that is the right r and the left l, component 3-dimensional optical informations which can revive the parallax effect and the 3-dimensional feeling are alternately arranged without the overlap or the deficit implies great significant meanings. That is, in case where the 3-dimensional optical informations r, l are alternately arranged without the deficit or overlap, if the positive film taken of such condition is projected on the 3-dimensional image revival screen 61, 62, 68 of the present invention shown in FIGS. 22, 23 and 24, then the 3-dimensional image without the deficit is revived, however, if the deficit portion 21' and the overlap portion 22' exist in the optical informations of the two components as explained in FIG. 8-A and 9, then the chaos in the image is caused in the overlap portion 22' and the clear 3-dimensional image is not obtained due to the deficit portion 21'. If the image is enlarged into a large screen such as a movie, then the further deteriorated 3-dimensional image is revived. The reason why the two component 3-dimensional optical informations r, l are alternately arranged without the overlap and deficit in case of the vertical equal width multiple slit grating 20' and the vertical equal width multiple holographic slit grating 20" is because the opaque portion of the vertical equal width multiple slit grating 20' perform the function of preventing the overlap and the transparent portion and the opaque portion of the same width performs the function of preventing the deficit. Eyes of Human being can distinguish the 3-dimensional material because two eyes are transversely apart about 6.3–6.5 cm from each other and can notice the transverse parallax effect, and because of that, when the 3-dimensional photograph is shown to our eyes which is made by the 3-dimensional camera 29' of the present invention equipped with the stereo photograph adaptor 29 of the present invention shown in FIG. 11-A or with an optical system fitted with a light shielder having about 6 cm width in the center of the lens when the diameter of the lens is larger than 7 cm, we can see a 3-dimensional image adapted to the structure of the eyes of human being. Therefore, in case where the prior art camera is modified by placing the vertical equal width multiple slit grating 20' or the vertical equal width multiple holographic slit grating 20" with certain distance in front of the image plane of the prior art camera which has the lens of more than 7 cm diameter as in the movie photographer, the 3-dimensional optical information which can realize the 3-dimensional image can be obtained with easy, however, because the diameter of the usual lens is smaller than 7 cm in case of the usual camera, the improved stereo photography adaptor 29 must be used as shown in FIG. 11-A to obtain the 3-dimensional image adapted to the function of eyes of men. Here, the spacing of the two mirrors 24, 25 facing the subject 28 is made about 6–6.5 cm and the two mirrors 26, 27 facing against the two mirrors 24, 25 form a certain angle α, where the angle α is determined so that when the light rays reflected at two mirrors 24, 25 facing the subject 28 are again reflected at the two inner mirrors 26, 27, collimated through the lens optical system 18 and reach the image plane, the two light paths coincide at the image plane. Placing the stereo photography adaptor 29 of the present invention at the usual camera having the lens of smaller than 7 cm diameter, and installing the vertical equal width multiple slit grating 20' of a kind of the 3-dimensional optical information resolving means 20 in front of the image plane of the above said camera result in a 3-dimensional camera. In case where the grating is installed a certain distance in front of the image plane in the usual camera equipped with the improved stereo photograph adaptor 29, the optical information emitted by the subject passes the stereo photography adaptor 29, is collimated at the lens and becomes the 3-dimensional optical information resolved into two components through the vertical equal width multiple slit grating 20' of a kind of the 3-dimensional optical information resolving means 20, whereby the image carrying the 3-dimensional optical information is recorded on the film 23 located at the image plane, and therefore, the photograph carrying the 3-dimensional optical information is adapted to the eyes of men. In addition, if the vertical equal width multiple slit grating 20' of a kind of the 3-dimensional optical information resolving means 20 located in front of the image plane of the 3-dimensional camera capable of recording the image having the 3-dimensional optical information is moved away from the light path and if the improved stereo photograph adaptor 29 of the present invention is not equipped, then the function of the prior air camera capable of recording the usual 2-dimensional image is maintained.

Furthermore, applying the optical principle explained in FIG. 7 as it is, if each of the images 28" of the subject carrying 3-dimensional optical informations is photographed on the film by utilizing a 3-dimensional camera or 3-dimensional photographer of the present invention composed of two optical systems 18 installed with a certain spacing or a plurality of optical systems 18 in some cases although such cases are not shown in the drawings, and of vertical equal width multiple slit gratings 20' placed a certain distance in front of the image plane corresponding to each optical system 18, the optical system being formed with two incident portions of light by installation of one light shielder 18' vertical to the ground in front of middle of the optical system 18 as shown in FIG. 11-B, and if each of the images 28" is enlarged and projected on the fourth 81, fifth 83, sixth 92, seventh 97, eighth 99 or ninth 101 3-dimensional image revival screen so that the images 28" consist with each other, then even when the diameter of the lens of the usual camera is smaller than 6–7 cm, the 3-dimensional image can be revived. The FIG. 11-C shows a 3-dimensional camera or 3-dimensional photographer applied with the optical principle explained in FIG. 8-B, and they are comprised of a plurality, more than or equal to two, of optical system 18 installed with a certain spacing and formed with a plurality, more than or equal to two, of incident portion of light by installing two light shielder 18' or a plurality of light shielder 18' in some cases although such case is not shown in the drawing, the light shielder 18' being of grating structure which is installed vertical to the ground in front of each of optical system 18 and in which the width of transparent portion and the width of opaque portion are identical, and of a vertical unequal width multiple slit grating 21 which is placed with a certain distance in front of the image plane corresponding to each of optical system 18 and in which the width of opaque portion is wider than the width of transparent portion to a certain degree, and if each of the images 28''' of the subject carrying 3-dimensional optical informations is photographed on the film by utilizing such 3-dimensional camera or photographer and is enlarged and projected on the forth 81, fifth 83, sixth 92, seventh 97, eighth 99 or ninth 101 3-dimensional image revival screen so that the images 28''' consist with each other, then the 3-dimensional image can be revived.

Figure 12:
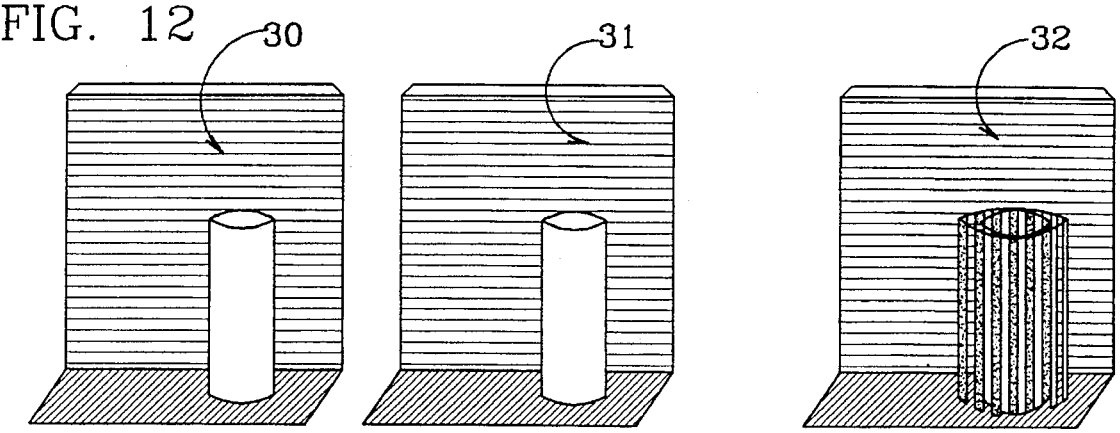
FIG. 12 illustrates a comparison between a positive film 32 recorded with 3-dimensional optical information photographed by a camera 29' of the present invention equipped with a stereo photograph adaptor 29 of the present invention, and a positive film 30, 31 taken by a prior art stereo camera.

Now, with reference to FIG. 12, comparing a 3-dimensional photograph 32 taken with a camera of the present invention capable of recording the 3-dimensional optical information emitted by the subject with two photographs 30, 31 taken with the prior art stereo camera for obtaining the 3-dimensional effect, two pictures 30, 31 were required to realize the 3-dimension in the prior art while the 3-dimensional photograph of the present invention is possible with only one picture 32. FIG. 12 is a drawing in which both photographs are enlarged to highlight the characteristics, where the spacing with which the 3-dimensional optical informations of two images in the photograph 32 are recorded with the resolved 3-dimensional optical informations is in practice only a few ten μ, therefore, it has no difficulty to present the two image into one picture. Because the 3-dimensional optical informations of the two kinds are alternately recorded on one picture 32 without overlap, if the positive film 33 of the present invention taken continuously is projected onto the 3-dimensional image revival screen 61, 62, 68 shown in FIGS. 22, 23 or 24, the 3-dimensional image can be realized by using the prior art projector 34. Providing a plurality of incident portion of light, more than three, at the lens optical system by forming a light shielder having the grating structure in which the transparent portion and the opaque portion of the same width are alternately arranged vertical to the ground surface at the lens optical system of the generally used camera or movie photographer, and placing the unequal width multiple slit grating, in which the width of opaque portion is wider than the transparent portion to a certain ratio and the opaque portion and the transparent portion are alternately arranged vertical to the ground, at a certain position between the image plane and the lens optical system of a camera or movie projector, then a 3-dimensional camera or movie projector is obtained which can photograph the image resolved in as many 3-dimensional optical informations as incident portions of light formed at the lens optical system of the camera or movie photographer, and if the image resolved into 3-dimensional optical informations taken by the 3-dimensional camera or movie photographer is projected at the 3-dimensional image revival screen of the present invention then the 3-dimensional image can be revived.

Figure 14:
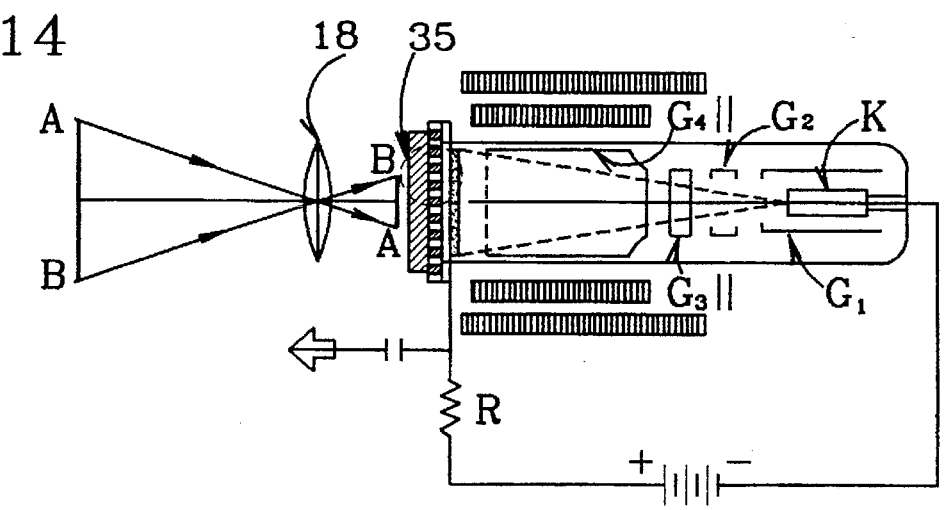
FIG. 14 shows a composition of a 3-dimensional television camera or video camera of an embodiment of the present invention.
Figure 14A:
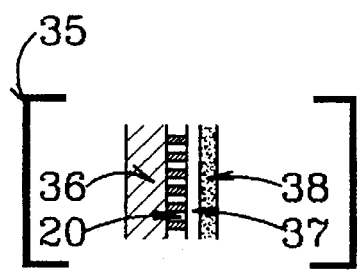
FIG. 14A shows an enlarged view of a portion of FIG. 14.

With reference to FIGS. 14 and 14A, the structure of 3-dimensional television camera or video camera of the present invention is described now. If a part of electron scanning tube of the prior art television camera or video camera is modified, it becomes the 3-dimensional photographer capable of recording the 3-dimensional optical information. The image plane of the prior art electron scanning tube is consisted of the face plate 36, the nesa 37 and the target 38, while the image plane 35 of the 3-dimensional television camera or video camera of the present invention is consisted of the vertical equal width multiple slit grating 20' or the vertical unequal width multiple slit grating 21 in which the width of opaque portion is wider than the width of transparent portion to a certain ratio of a kind of 3-dimensional optical information resolving means 20, the nesa 37 and the target 38 so that the image plane 35 is equivalent to one in which the face plate 36 of the image plane structure of the prior art electron scanning tube is replaced by the vertical equal width multiple slit grating 20' or the vertical unequal width multiple slit grating 21 in which the width of opaque portion is wider than the width of transparent portion to a certain ratio. At this time, in case where the vertical equal width multiple slit grating 20' or the vertical unequal width multiple slit grating 21 in which the width of opaque portion is wider than the width of transparent portion to a certain ratio is thin, it is possible to place the face plate 36 in front of the vertical equal width multiple slit grating 20' or the vertical unequal width multiple slit grating 21 in which the width of opaque portion is wider than the width of transparent portion to a certain ratio. Here, there is no significant change in the function if the vertical equal width multiple slit grating 20' is replaced by the vertical equal width multiple holographic slit grating 20". If the subject is photographed with the stereo photograph adaptor 29 of the present invention illustrated in FIG. 11 fitted in front of the lens optical system of the television camera in which the image plane is constructed as described above or without the adaptor 29 fitted in case the lens is large, then the photographer converts the intensity of light emitted from the landscape or the profile carrying the 3-dimensional optical information recorded at the image plane 35 into the electrical intensity signal carrying the 3-dimensional image information. To revive the electrical signal carrying such 3-dimensional image information into 3-dimensional image, the 3-dimensional television receiver is required, and now the 3-dimensional television receiver of an embodiment of the present invention is described. The fact the prior at television can be converted into the 3-dimensional television receiver of the present invention with only little modification has significant meanings in practice.

Figure 15:
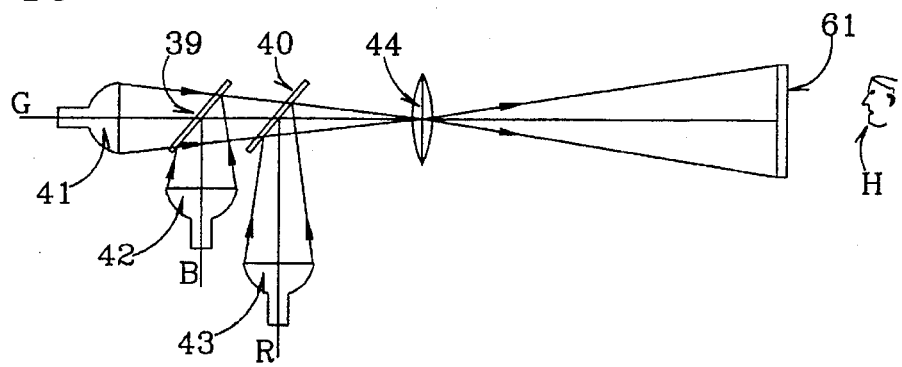
FIG. 15 shows a composition of a 3-dimensional television receiver of an embodiment of the present invention utilizing a 3-dimensional image revival screen 61 of a first embodiment of the present invention.

FIG. 15 shows the structure of the 3-dimensional television receiver of trinescope type, which is constructed in such a way that the 3-dimensional image information optically synthesized in the known trinescope television receiver which can optically synthesize the color signals emitted by three Braun tube, that is Red R 43, Green G 41, Blue B 42, through dichroic mirrors 39, 40. Such 3-dimensional image information is enlarged by the optical system 44, and then the enlarged image can be seen as 3-dimensional image through the 3-dimensional image revival screen 61, 62, 68 of the present invention shown in FIGS. 22, 23, and 24. The acting effect of it is that the electrical signal carrying the 3-dimensional image information transmitted through the 3-dimensional television camera or video camera of the present invention is converted to the 3-dimensional image.

Figure 16:
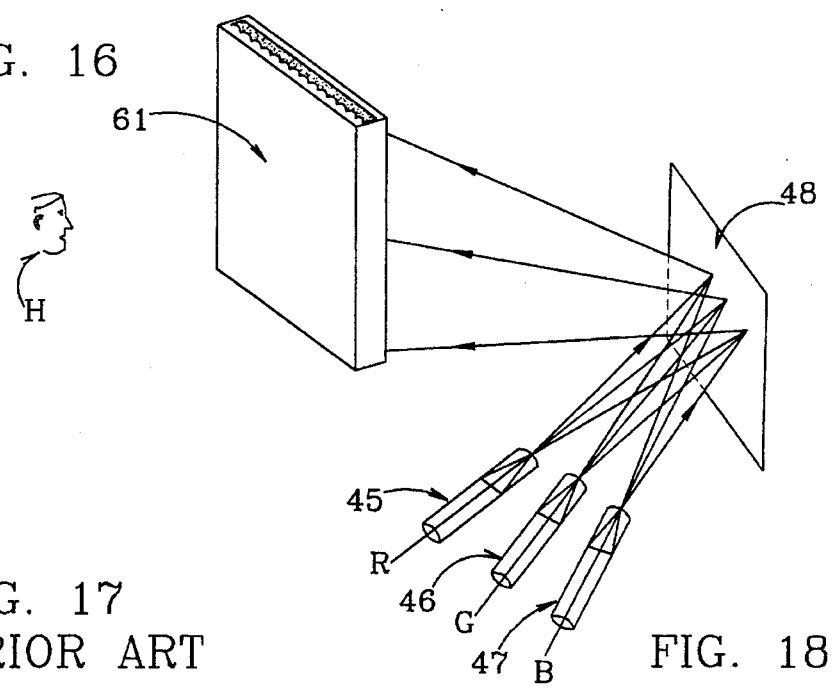
FIG. 16 shows a composition of a retro reflective 3-dimensional television receiver of an embodiment of the present invention utilizing the 3-dimensional image revival screen 61 of the first embodiment of the present invention.
Figure 17:
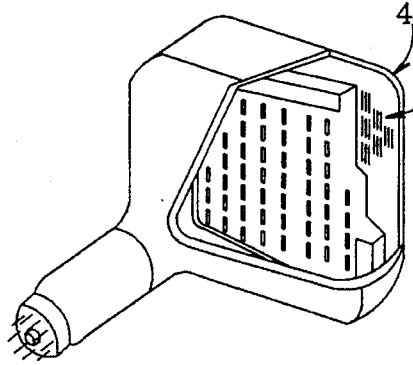
FIG. 17 shows a prior art television receiver in which a streak of a picture cell of a picture element is vertical.
Figure 18:
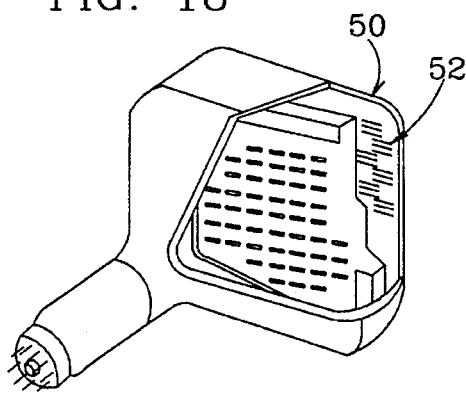
FIG. 18 shows a present invention 3-dimensional television receiver in which a streak of a picture cell of a picture element transverse.

FIG. 16 shows the structure of 3-dimensional retroreflective television receiver, where if the electrical signal carrying the 3-dimensional image information transmitted by the 3-dimensional television camera or video camera of the present invention is received and converted into the image carrying 3-dimensional image information through three Braun tube 45, 46, and 47, and the enlarged 3-dimensional image information of red, green and blue enlarged through the optical system is reflected at the mirror 48, and the enlarged 3-dimensional image is consistently imaged at the 3-dimensional image revival screen 61, 62, 68 of the present invention shown in FIGS. 22, 23 and 24 which is in front of the mirror 48, and finally if we observe the image carrying the imaged 3-dimensional optical information through the 3-dimensional image revival screen 61, 62, 68 of the present invention shown in FIGS. 22, 23 and 24, then the 3-dimensional image can be obtained. 3-dimensional liquid crystal television receiver which is one of the present inventions is constructed by installing a lenticular screen in front of the known liquid crystal television receiver, and the 3-dimensional liquid crystal television receiver revives 3-dimensional image with the electrical signal carrying 3-dimensional image signal transmitted through the image tube having means capable of resolving the optical information emitted by the subject into two, that is, left and right component 3-dimensional optical information. The 3-dimensional television receiver of one of the present invention capable of reviving the 3-dimensional image by using the color television receiver which is presently supplied generally is described with reference to FIGS. 17 and 18. In the 3-dimensional television receiver of the present invention the prior art panel glass 49 formed with a certain curvature is replaced by the lenticular screen 50 formed with same curvature as the panel glass 49, and in the prior art fluorescent plane the streaks of the three, that is, red, green and blue picture cells are arranged vertically to constitute a picture element 51, while in the present invention the streaks of three picture cells are arranged transversely to constitute a picture element 52. The 3-dimensional television receiver constructed as above can receive the signal sent from the 3-dimensional television camera or video camera and revive it again into the continuous 3-dimensional image.

From now on, the 3-dimensional image revival screen to revive the 3-dimensional image as described above will be described with reference to the accompanying drawing.

Figure 19:
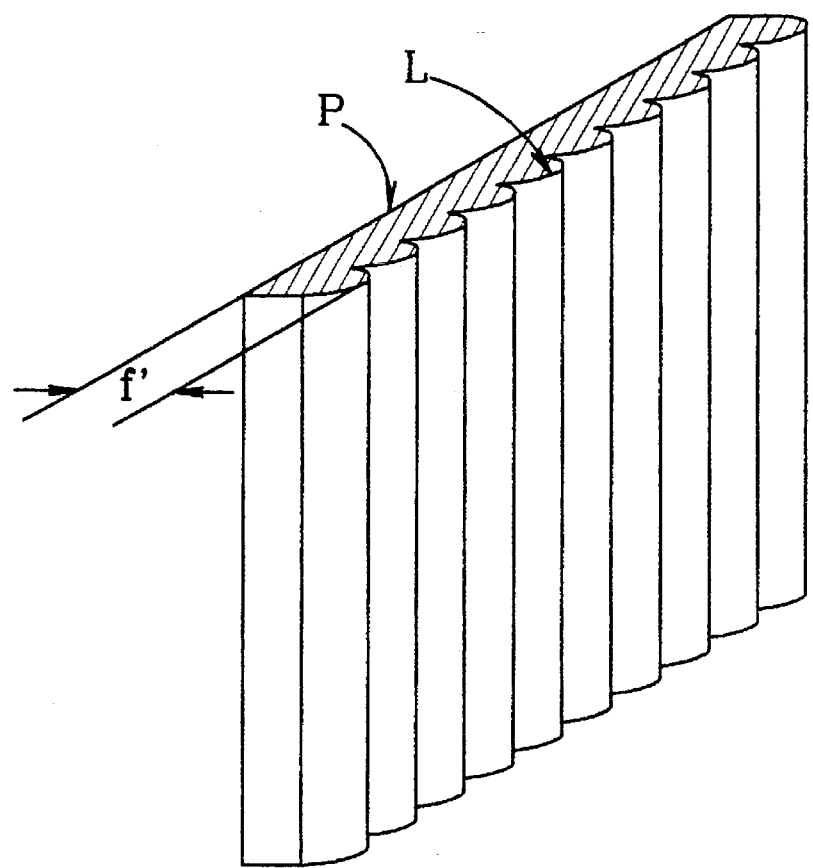
FIG. 19 is a perspective view of a known lenticular screen.

FIG. 19 shows a known lenticular screen as an example, which is constructed by vertically arranging a plurality of fine cylindrical lenses L having transversely constant curvature and composed of media of refractive index of n', and by forming focal plane P having thickness as large as the focal length f' of such cylindrical lens L. In addition, the focal plane P of such known lenticular screen is not opaque but transparent.

Figure 20:
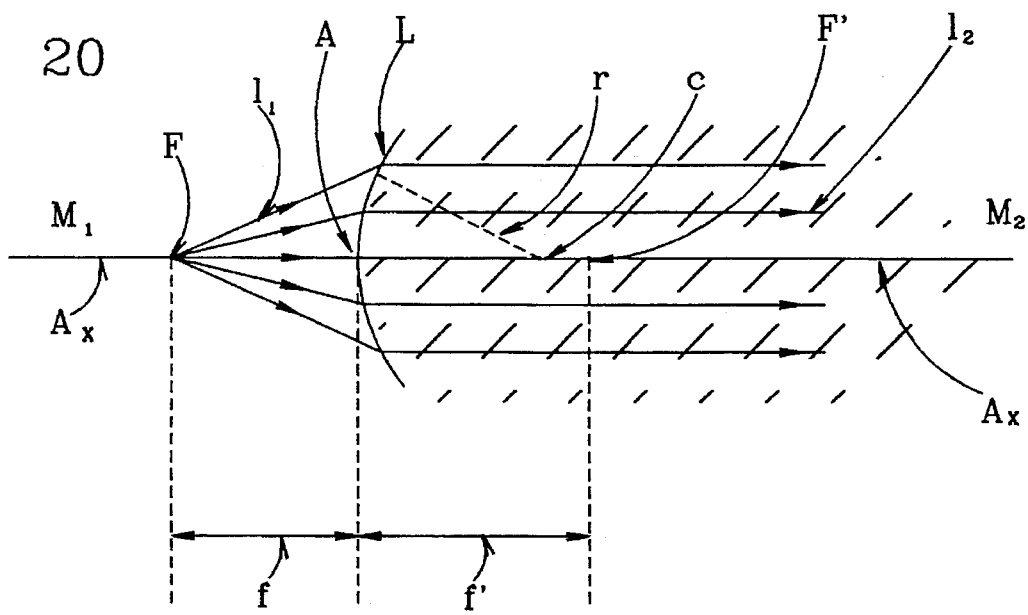
FIG. 20 and 21 illustrate geometrical optical function of refraction of light of plano-convex lens, FIGS. 22, 22B and 22A, respectively, show a section, perspective view and a partial enlarged view of a 3-dimensional image revival screen 61 of the first embodiment of the present invention.

Now, to aid to understand the optical function of such cylindrical lens L, the geometrical optical characteristics of a plano-convex lens shown in FIG. 20 will be explained. When the light ray $l_1$ emitted from a light point located at the focal point F in the first media $M_1$ having the refractive index n located at the left of the planar convex spherical lens L of the second media $M_2$ having the refractive index n' diverges toward the plano-convex lens L, it becomes a beam of light $l_2$ parallel to the optical axis Ax of the second media $M_2$ after being refracted at the plano-convex lens L, as a result, the image of the light point in the first media $M_1$ is imaged at the infinity ∞.

Figure 21:
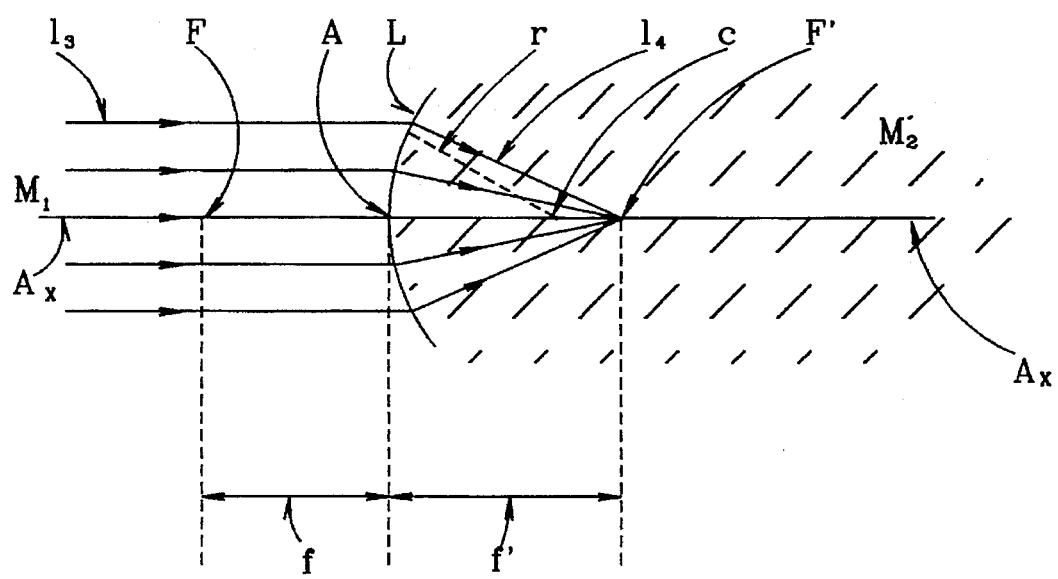

In FIG. 21, when the light ray $l_3$ parallel to she optical axis Ax of the first media $M_1$ having the refractive index n is incident to the plano-convex lens L of the second media $M_2$ having the refractive index n', it is refracted at the plano-convex lens, and the refracted light $l_4$ is centered at the focal point F' of the second media $M_2$. In FIG. 21, supposing that a light point is at the focal point F' of the second media $M_2$, and applying the principle of retrograde travel of a light, then the light is refracted at the plano-convex lens L and becomes a beam of light parallel to the optical axis Ax of the first media $M_1$ having the refractive index n, therefore, the image of the light point at the focal point F' of the second media $M_2$ is imaged at the infinity ∞. Here, the important fact is that the second focal length f' of the plano-convex lens L toward the second media $M_2$ maintaining the curvature radius r and composed of the second media $M_2$ having the refractive index n' is not the same as the first focal length f of the first media $M_1$ having the refractive index n. In the 3-dimensional image revival screen 61 used in the present invention, the optical information transmitting media is not the second media $M_2$ having the refractive index n' but the air on the side of the first media $M_1$ having the refractive index n=1, and the focal plane P is constructed to be semitransparent, and also the arrangement of the cylindrical lens must be vertical to the ground surface.

The construction of the first embodiment 3-dimensional image revival screen 61 of the present invention is described with reference to FIGS. 22, 22A and 22B. The first embodiment 3-dimensional image revival screen 61 is composed of a first screen 55 in which a reflection preventing coating layer 56 is formed on the outer surface opposite to the observer H and a semitransparent portion 54 is formed on the inside, a second screen 60 which is lenticular screen facing the semitransparent portion 54 of the first screen 55 and composed of a plurality of fine cylindrical lens 59 having only transversely constant curvature, and an air layer 57 having the refractive index n=1 located between the two screens 55, 60. The flat surface of the second screen 60 faces the observer H. Here the distance of the air layer 57 is the distance between the apex 58 of the cylindrical lens 59 composing the second screen 60 and the semitransparent portion 54 of the first screen 55 and is referred to as the objective distance s, the objective distance s is same as the focal length of the cylindrical lens 59 composing the second screen 60. Therefore, the image carrying the optical information of 3-dimensional image imaged at the semitransparent potion 54 of the first screen 55 acts as the subject for the cylindrical lens 59 composing the second screen 60. Therefore, the light ray diverging from the image carrying the 3-dimensional image optical information imaged at the semitransparent portion 54 of the first screen 55 is refracted at the cylindrical lens 59 composing the second screen 60 to be an independent beam of light having the light path to each other which images an image at the infinity ∞. When observing the independent beam of light carrying such each light path, we can feel the transverse parallax effect and the 3-dimensional feeling. The characteristics of the first embodiment 3-dimensional image revival screen 61 of the present invention is that because the optical information transmitting media between the second screen 60 and the semitransparent portion 54 of the first screen 55 is the air layer 57, the thicknesses of the first screen 55 and the second screen 60 and the object distance s can be freely adjusted under the condition that the object distance s between the first screen 55 and the second screen 60 is taken as the focal length of the cylindrical lens 59 composing the second screen 60. To explain such characteristics, the Gaussian formula for the plano-convex lens can be applied, and if the formula is applied with reference to FIG. 22, it renders $$\frac{n}{s} + \frac{n'}{s'} = \frac{n'-n}{r} .$$

Here, the n' indicates the refractive index of the air layer 57, the n' indicates the refractive index of the media composing the first screen 55 or the second screen 60, and the r indicates the curvature radius of the cylindrical lens 59 composing the second screen 60. s and s' indicates the object distance and the image distance respectively, and the object distance s is taken as the focal length of the cylindrical lens 59 composing the second screen 60. Supposing that the image carrying the 3-dimensional image information exists at the semitransparent portion 54 of the first screen 55, as explained in FIGS. 20 and 21, the light ray emitted from the image is refracted at the cylindrical lens 59 composing the second screen 60, then each light path becomes the independent beam of light, and the image at the semitransparent portion 54 of the first screen 55 is imaged at the infinity ∞, therefore, the image distance s' from the cylindrical lens 59 composing the second screen 60 to the image imaged at the infinity ∞ becomes infinity. Therefore, substituting such relationship into the Gaussian formula, $$\frac{n}{s} + \frac{n'}{\infty} = \frac{n'-n}{r}$$

is obtained, and further because $$\frac{n'}{\infty} \approx 0, \frac{n}{s} = \frac{n'-n}{r}$$

is obtained. The object distance s is same as the focal length of the cylindrical lens 59 composing the second screen 60, therefore, $$\frac{n}{s} = \frac{n'-n}{r} \text{ becomes } \frac{n}{f} = \frac{n'-n}{r} ,$$

and because the space of the object distance s is filled with the air in the present invention, the refractive index $$n = 1 \text{ and } \frac{1}{f} = \frac{n'-1}{r}$$

is obtained. The thickness of the lenticular screen must be same as the cylindrical lens composing the lenticular screen to realize the 3-dimensional image with the known lenticular lens, however, in the first embodiment 3-dimensional image revival screen of the present invention, the air layer between the first screen 55 and the second screen 60 is intended to be the optical information transmitting media, so that the object distance s can be decreased as much as desired regardless of the thicker of the media composing the first screen 55 and the thickness of the media composing the second screen 60 as indicated by the last solution of the above formula, and in addition, because the thickness of the first screen 55 and the second screen 60 can be increased even when the object distance s is decreased, there is an advantage that the screen having no deflection can be constructed even if the screen is large. To improve the light permeability, the reflection preventing coating can be applied to the outer surface 56 of the first screen 55. However, in case of the known lenticular screen as shown in FIG. 19, the thickness is in general taken to be equivalent to the focal length f' of the cylindrical lens L, so that the thickness of the screen must be increased and the focal length f' must also be increased accordingly to make a large screen having no deflection. The thicker the lenticular screen is, the wider the range receiving the peripheral optical informations other than the paraxial rays which each cylindrical lens L receives, and eventually the more difficult the proper revival of the 3-dimensional image becomes. And if the focal length f' of the cylindrical lens L composing the known lenticular screen is shortened and the lenticular screen is made thin accordingly, the disadvantage that the screen is deflected is caused. FIG. 23 is a section of the second embodiment 3-dimensional image revival screen 62 of the present invention, which is composed of a first screen 64 of certain thickness having the reflection preventing coating layer 63 on the outer surface opposite to the observer H, and a second screen 66 which is lenticular screen formed with the semitransparent portion 65 so that the image carrying the 3-dimensional optical information can be imaged on the focal plane which is located at the focal length f' of the cylindrical lens 67 facing the observer H. FIG. 24 is a section of the third embodiment 3-dimensional image revival screen 68 of the present invention, which is a lenticular screen where the image carrying the 3-dimensional optical information is imaged on the semitransparent portion 69 formed on the focal plane in the lenticular screen 68 of the same thickness as the focal length f' of the cylindrical lens 70.

Figure 13:
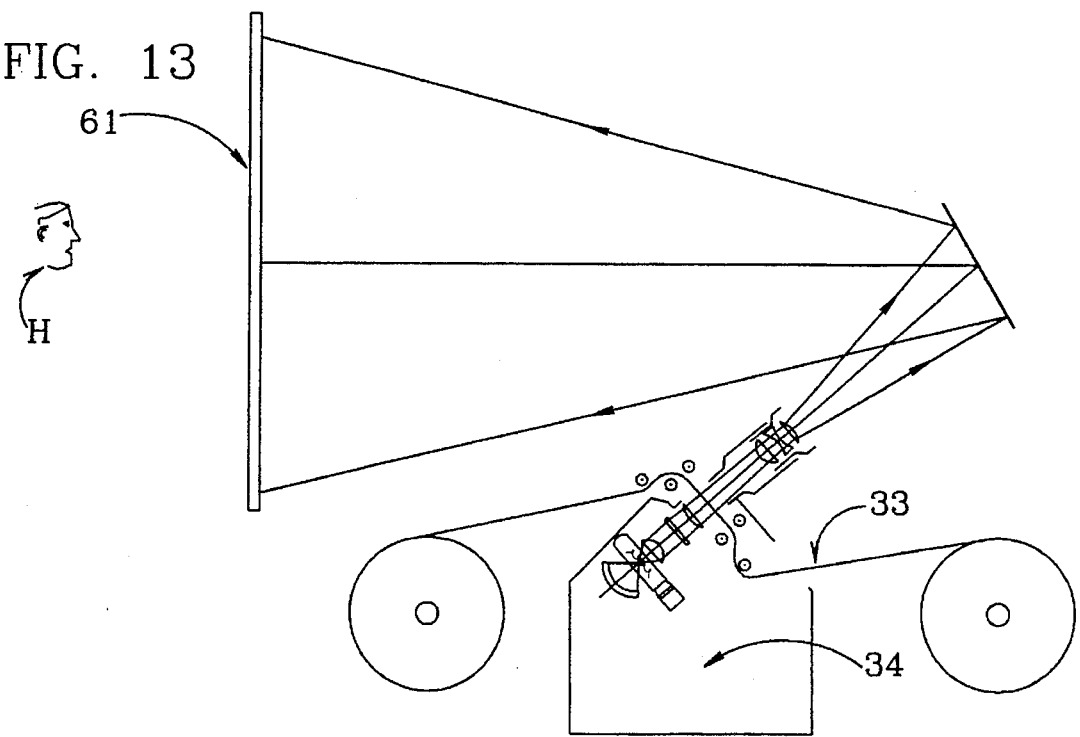
FIG. 13 is a first embodiment of the 3-dimensional movie when the image on a positive film carrying a 3-dimensional optical information created by the present invention was projected onto a 3-dimensional image revival screen 61 of a first embodiment of the present invention.
Figure 25:
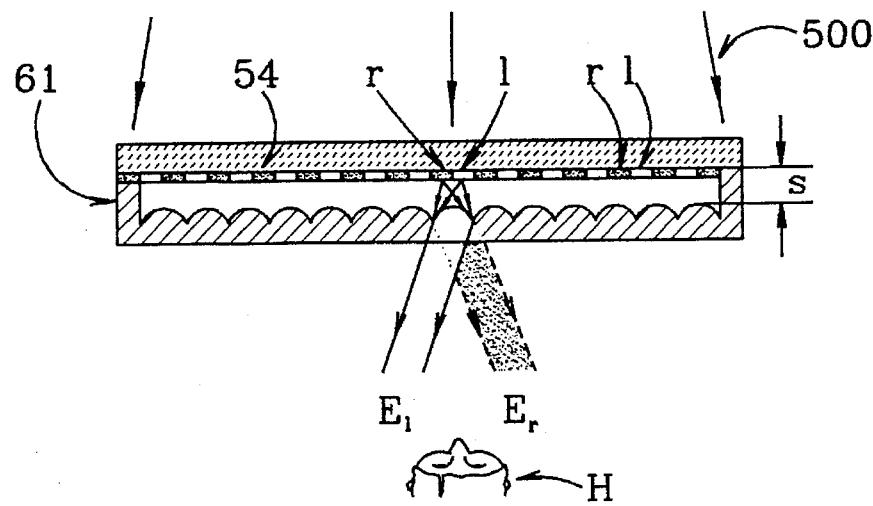
FIG. 25 illustrates a function of revival of a 3-dimensional image of the 3-dimensional image revival screen 61 of the first embodiment.
Figure 26:
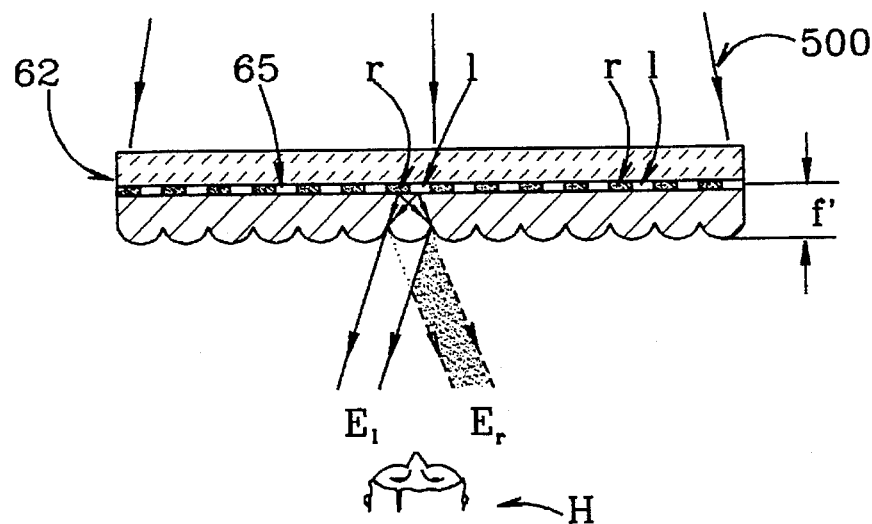
FIG. 26 illustrates a function of revival of a 3-dimensional image of the 3-dimensional image revival screen 62 of the second embodiment.
Figure 27:
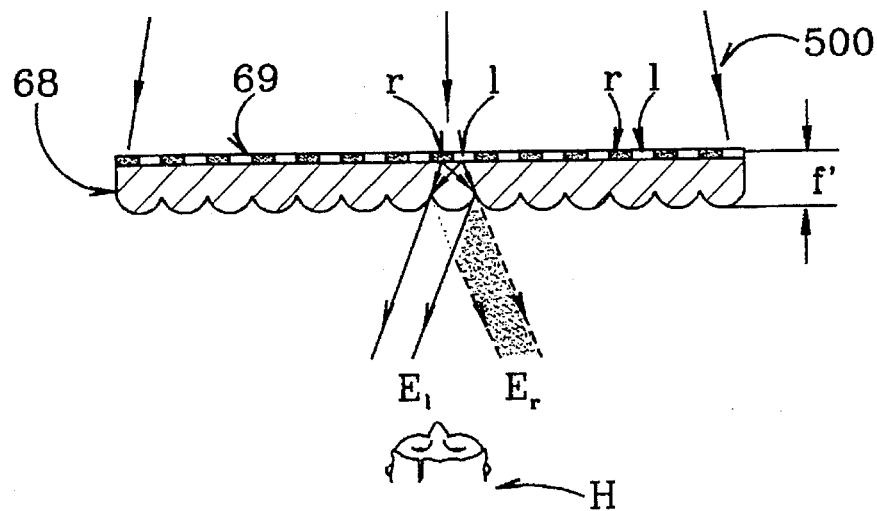
FIG. 27 illustrates a function of revival of a 3-dimensional image of the 3-dimensional image of the 3-dimensional image revival screen 68 of the third embodiment.

FIGS. 25, 26 and 27 are the sections which illustrate the function of 3-dimensional image revival of the 3-dimensional image revival screens 61, 62 and 68 of the present invention when the 3-dimensional image optical information 500 is imaged on the 3-dimensional image revival screens 61, 62 and 68 of the three embodiments of the present invention as shown in FIGS. 13, 15 and 16. The function of the 3-dimensional image revival screens 61, 62 and 68 of the present invention will be explained mainly based on these screens. The optical informations resolved into the right and left ones and produced by being alternately arranged on the semitransparent portions 54, 65 and 69 of the 3-dimensional image revival screen 61, 62 and 68 of the present invention without the deficit or overlap portion reach the eyes of the observer H through the cylindrical lens composing the lenticular screen and through the independent right $E_r$ and left $E_l$ paths respectively and image the images identical with each other but having different optic angles on the retinas of the right and left eyes of the observer H, whereby the transverse parallax and the integrated 3-dimensional feeling are recognized at the optic center of central nerve system of the observer H.

From now on, descriptions will be given about the embodiments in which the independent right and left two images in one film taken of the subject in two directions having the right and left different optic angles respectively are projected to consist with each other and then revived as the 3-dimensional image.

Figure 28:
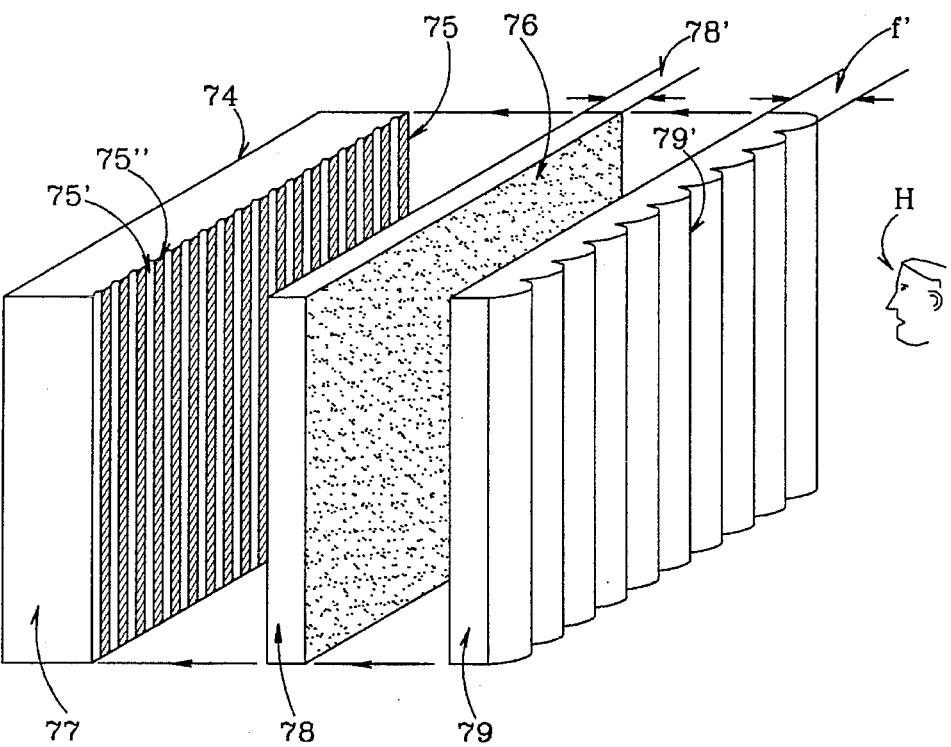
FIG. 28 is an exploded view of the 3-dimensional image revival screen 81 of the fourth embodiment of the present invention.
Figure 29:
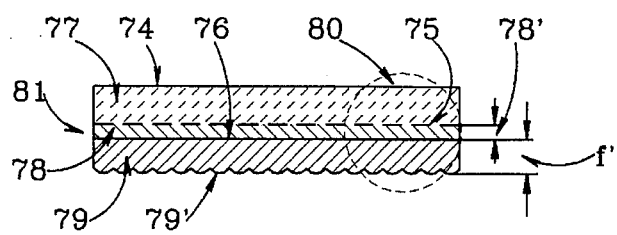
FIG. 29 is a section of the 3-dimensional image revival screen 81 of the fourth embodiment of the present invention.
Figure 30:
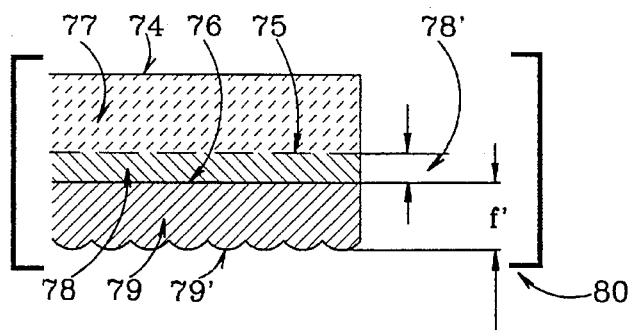
FIG. 30 is a partial enlarged view of the 3-dimensional image revival screen 81 of the fourth embodiment of the present invention.
Figure 31:
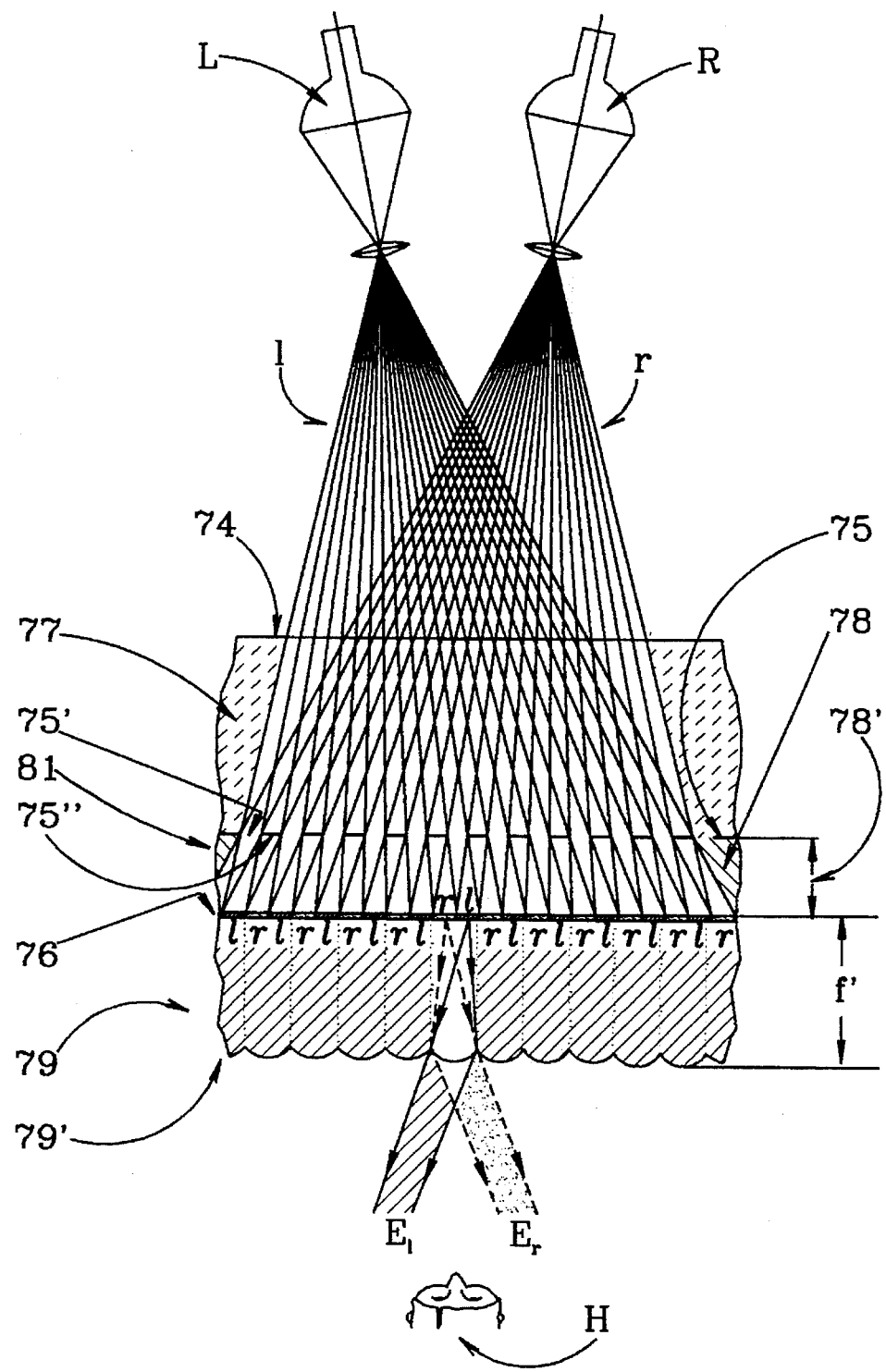
FIG. 31 illustrates a function of revival of a 3-dimensional image of the 3-dimensional image revival screen 81 of the fourth embodiment of the present invention.

FIG. 28 is an exploded view of the fourth embodiment 3-dimensional image revival screen 81, where the screen 81 is composed of the first screen 77 having the reflection preventing coating layer 74 on the outer surface opposite to the observer H and formed with the equal width multiple slit grating 75 or the equal width multiple holographic slit grating in which the widths of the transparent portion 75' and the opaque portion 75" are same with each other, the second screen 78 of certain thickness 78' formed with the semitransparent portion 76 on which the image can be imaged on the side of the observer H, and the third screen 79 having the cylindrical lens 79' on the side of the observer H, the thickness of the third screen 79 being same as the focal length f' of the cylindrical lens 79' composing the third screen 79. If these three kinds of screens 77, 78 and 79 are brought in contact with each other, the fourth embodiment 3-dimensional image revival screen 81 of the type shown in FIG. 29 results. FIG. 30 is the partial enlarged view of FIG. 29. FIG. 31 is an enlarged view illustrating the function of the 3-dimensional image revival of the fourth embodiment 3-dimensional image revival screen 81 of the present invention shown in FIG. 29, the function being described below. It provides a method in which the electrical signal of the right and left two images photographed by utilizing two cameras apart a certain distance from left to right with respect to the subject or by fitting the prior art stereo photography adapter 2 shown in FIG. 1 to a television camera is received by the television receiver and the independent two images can be revived by resolving them into two independent right and left image informations. When two images enlarged and collimated after two images l, r independent to each other reproduced by the Braun tubes L, R in the television receiver are passed through each optical system are imaged on the fourth embodiment 3-dimensional image revival screen 81 of the present invention to consist with each other, they are resolved into 3-dimensional optical informations r, l through the equal width multiple slit grating 75 or the equal width multiple holographic grating arranged vertical to the ground surface and formed on the first screen 77 of the fourth embodiment 3-dimensional image revival screen 81 of the present invention, and are imaged on the semitransparent portion 76 of the second screen 78 without overlap or deficit, then the 3-dimensional optical informations r, l imaged on the second screen reach the eyes of the observer H through the lenticular screen of the third screen 79 and through the independent right E and left E optical paths resulting in images identical with each other but having different optic angles on the retinas of the right and left eyes of the observer H, whereby the transverse parallax and the integrated 3-dimensional feeling are recognized at the optic center of central nerve system of the observer H. After placing the polarizing filter at the appropriate position of each optical system which the two independent images l, r pass through respectively, if the observer H observes wearing the polarizing glasses, then he can also observe the 3-dimensional image. This means that the 3-dimensional image can be observed with the naked eyes and also by applying the polarizing filter or polarizing glasses utilizing the optical characteristics of the polarized light.

Figure 32:
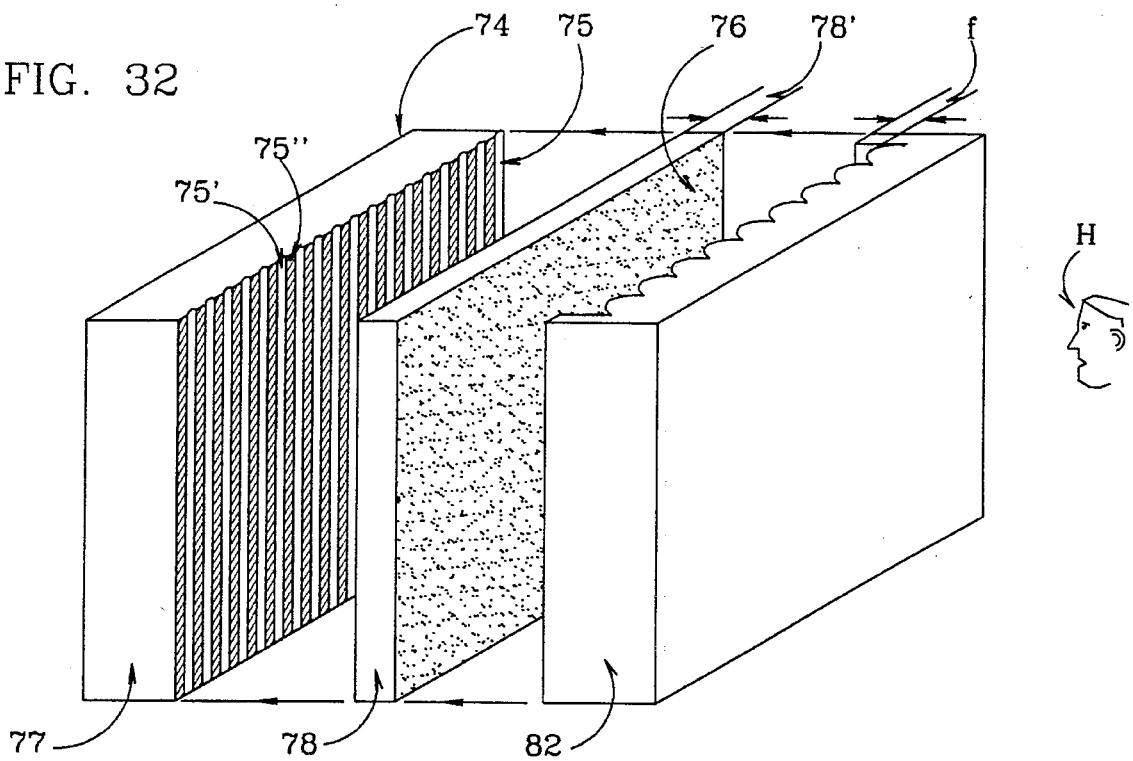
FIG. 32 is an exploded view of the 3-dimensional image revival screen 83 of the fifth embodiment of the present invention.
Figure 33:
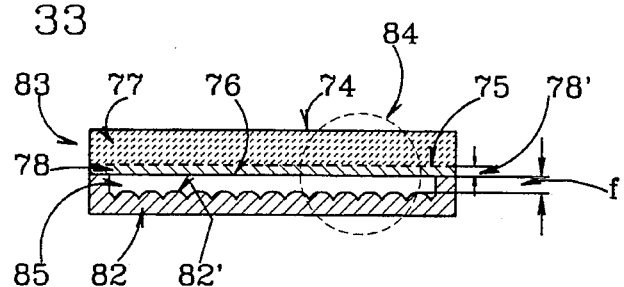
FIG. 33 is a section of the 3-dimensional image revival screen 83 of the fifth embodiment of the present invention.
Figure 34:
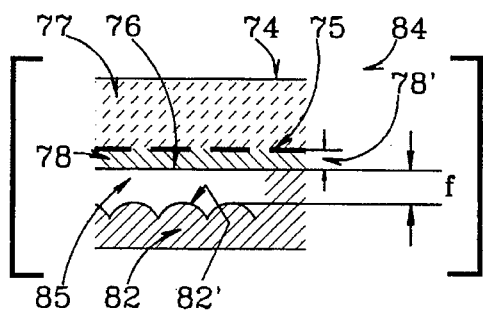
FIG. 34 is a partial enlarged view of the 3-dimensional image revival screen 83 of the fifth embodiment of the present invention.
Figure 35:
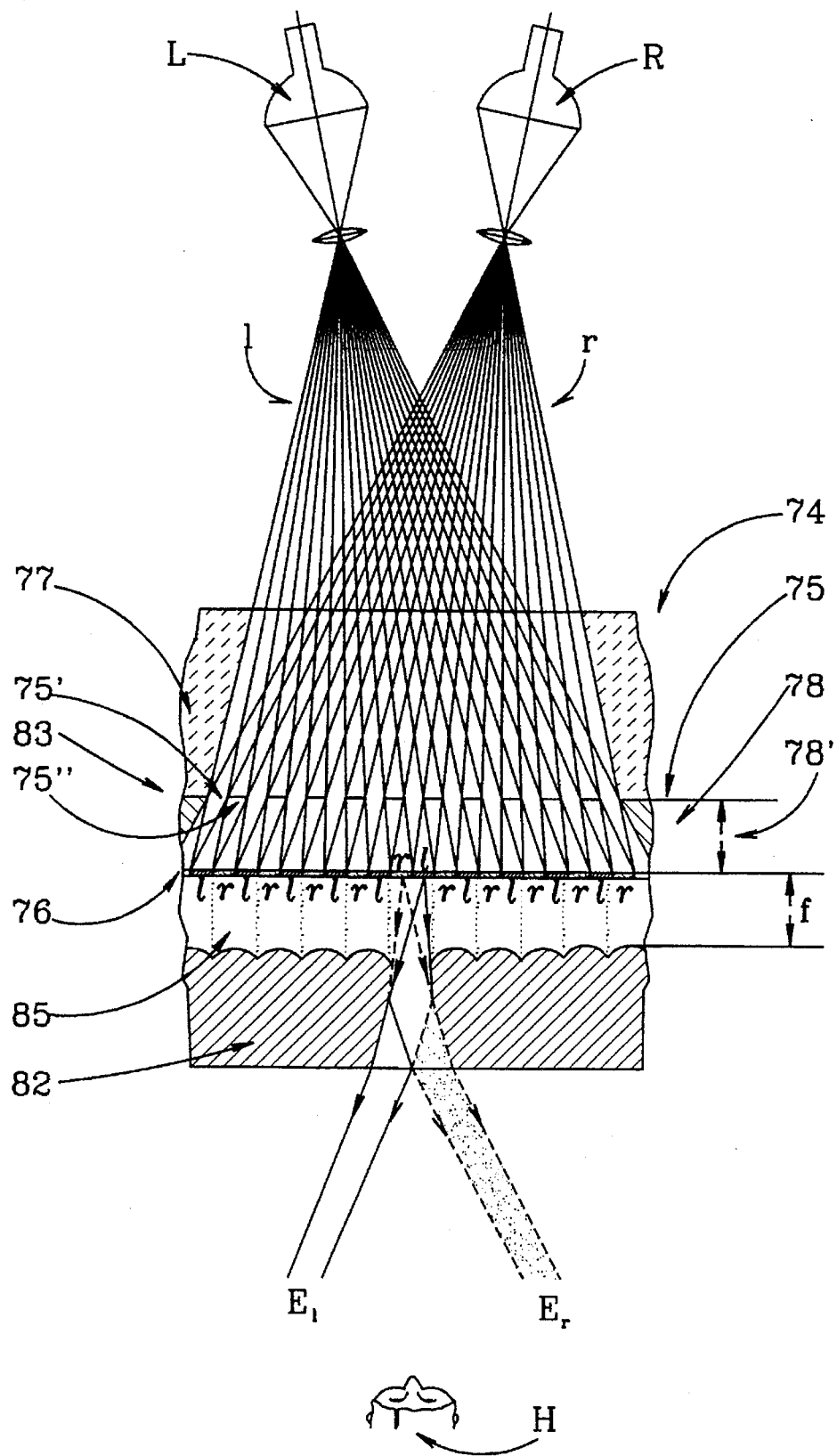
FIG. 35 illustrates a function of revival of a 3-dimensional image of the 3-dimensional image revival screen 83 of the fifth embodiment of the present invention.

FIG. 32 is the exploded view of the fifth embodiment revival screen of the present invention, the technical constitution of it being that the first screen 77 and the second screen 78 are same with the first screen 77 and the second screen 78 in view of the construction shown in FIG. 28, however the fact that the air layer 85 between the second screen 78 and the third screen 82 is constructed as the transmitting media of the 3-dimensional image information is different from FIG. 28. At this time the length f of the air layer between the apex 82' of the cylindrical lens composing the third screen 82 which is lenticular screen and the semitransparent portion 76 of the second screen 78 is made to be same as the focal length of the cylindrical lens composing the third screen 82. The cylindrical lens composing the third screen 82 which is lenticular screen faces the semitransparent portion 76 of the second screen 78. There are advantages that the stable flatness of the screen can be maintained because the thickness of the media composing the third screen 82 can be freely adjusted due to the technical constitution having such characteristics, and the delicate 3-dimensional image can be reproduced because the size and the focal length of the cylindrical lens composing the third screen 82 can be decreased as much as possible. FIG. 33 is the section of the fifth embodiment revival screen 83 formed when the three screens 77, 78 and 82 are brought in contact with each other. FIG. 34 is a partial enlarged view of FIG. 33. FIG. 35 illustrates the function of the 3-dimensional image revival of the fifth embodiment 3-dimensional image revival screen 83, and the screen 83 performs the same function explained with reference to FIG. 31, whereby the transverse parallax and the integrated 3-dimensional feeling are recognized at the optic center of central nerve system of the observer H.

Figure 36:
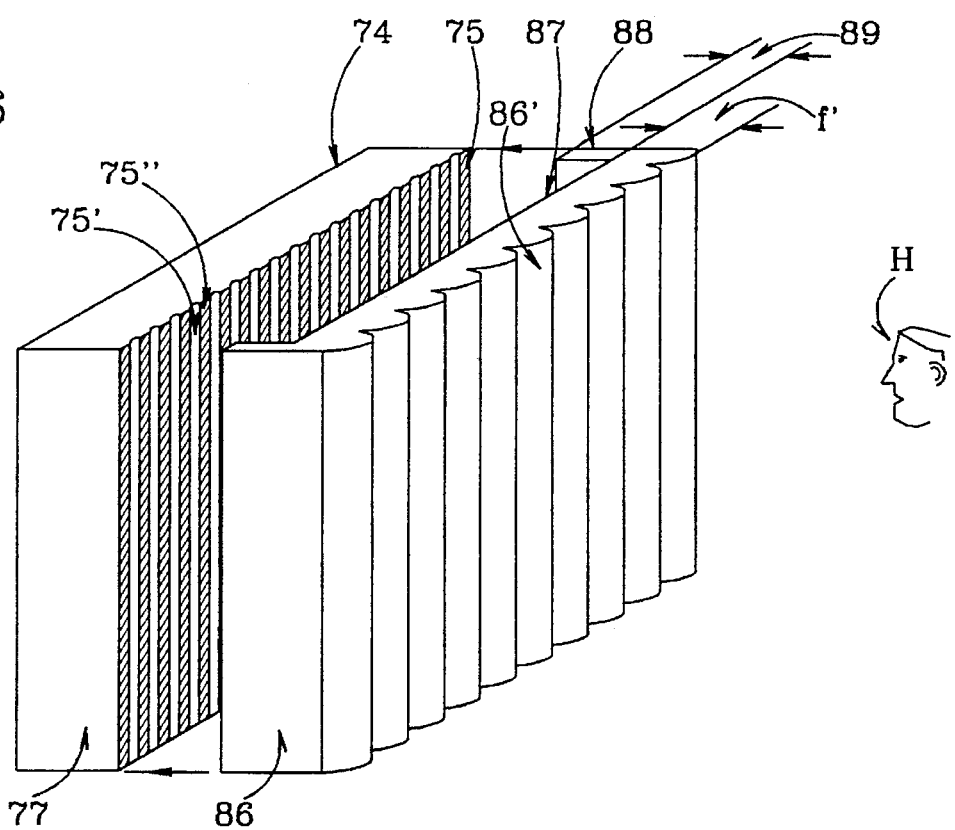
FIG. 36 is an exploded view of the 3-dimensional image revival screen 92 of the sixth embodiment of the present invention.
Figure 37:
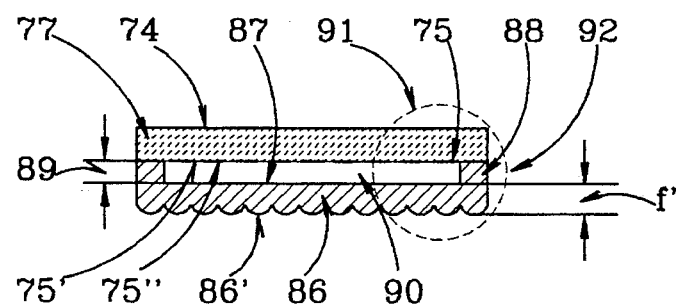
FIG. 37 is a section of the 3-dimensional image revival screen 92 of the sixth embodiment of the present invention.
Figure 38:
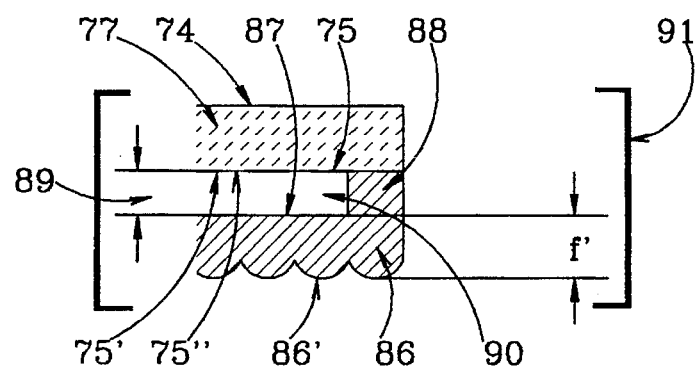
FIG. 38 is a partial enlarged view of the 3-dimensional image revival screen 92 of the sixth embodiment of the present invention.
Figure 39:
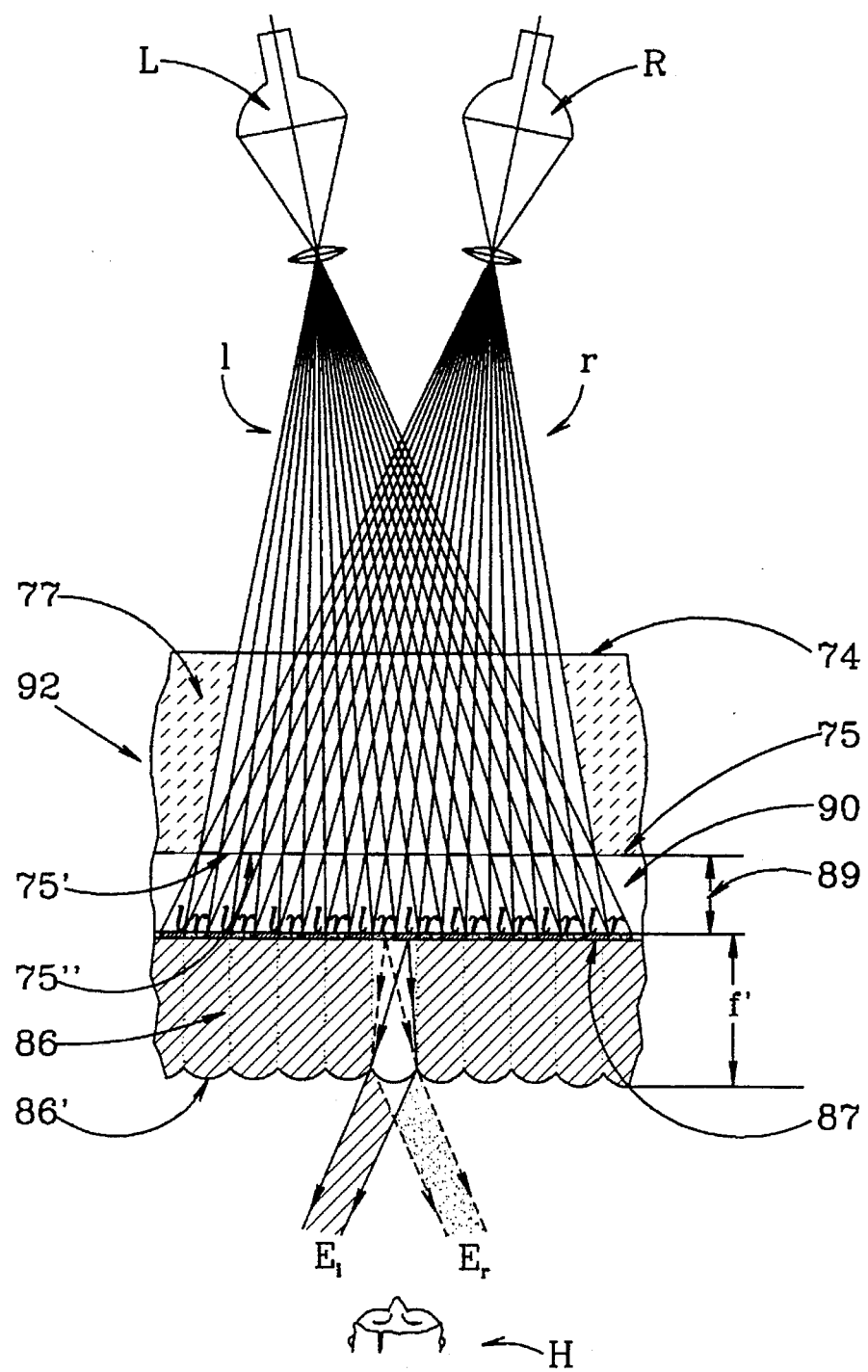
FIG. 39 illustrates a function of revival of a 3-dimensional image of the 3-dimensional image revival screen 92 of the sixth embodiment of the present invention.

FIG. 36 is an exploded view of the sixth embodiment 3-dimensional image revival screen 92, where the screen 92 is composed of the first screen 77 having the reflection preventing coating layer 74 on the outer surface opposite to the observer H and formed with the equal width multiple slit grating 75 or the equal width multiple holographic slit grating in which the widths of the transparent portion 75' and the opaque portion 75" are same with each other, and the second screen 86 which is lenticular screen the flat surface of which in contact with the air layer 90 is composed of the semitransparent portion 87 and having the air layer 90 of certain distance 89 between itself and the first screen 77. The thickness of the second screen 86 is same as the focal length f of the cylindrical lens 86' composing the second screen 86, and the cylindrical lens 86' faces the observer H. If the first screen 77 and the leg portion 88 of the second screen 86 having the same thickness as the length of the air layer 90 are brought in contact with each other, the sixth embodiment 3-dimensional image revival screen 92 of the section shown in FIG. 37 results. Among the first screen 77 and the second screen 86 composing the sixth embodiment 3-dimensional image revival screen 92, the image carrying the 3-dimensional image informations resolved through the above said grating on the first screen 77 is imaged on the semitransparent portion 87 of the second screen 86. FIG. 38 is the partial enlarged view of FIG. 37. FIG. 39 illustrates the function of the 3-dimensional image revival of the sixth embodiment 3-dimensional image revival screen 92, and the screen 92 performs the same function explained with reference to FIG. 31, whereby the transverse parallax and the integrated 3-dimensional feeling are recognized at the optic center of central nerve system of the observer H.

Figure 40:
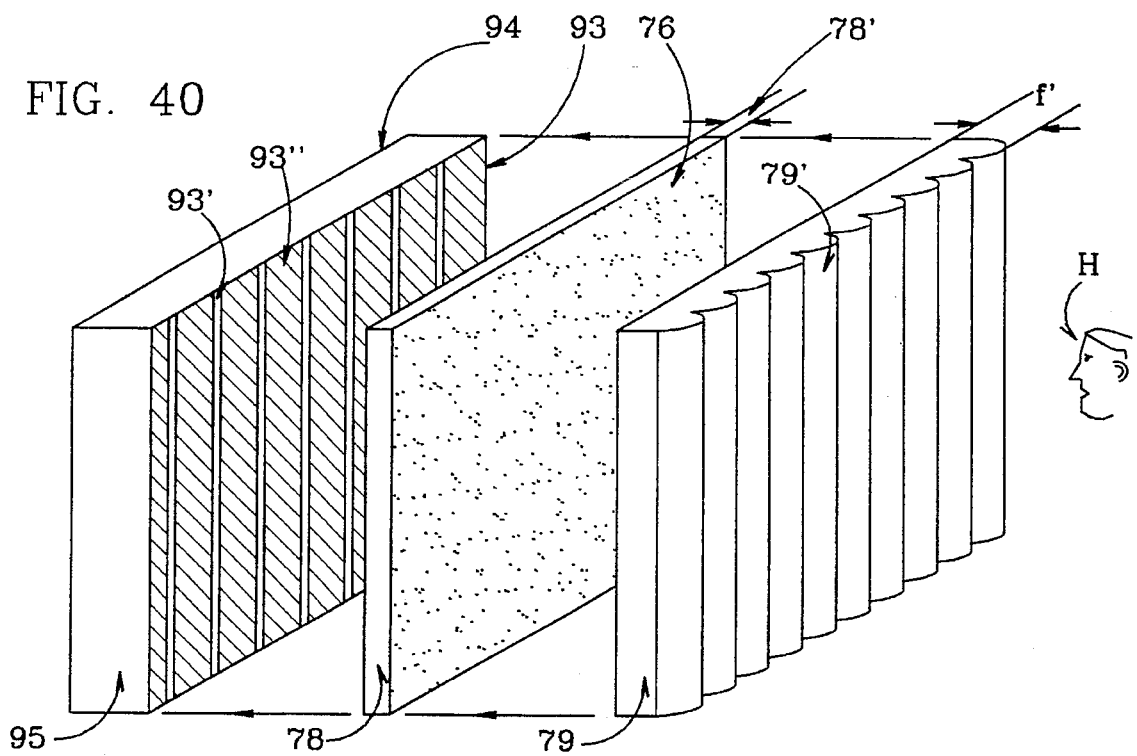
FIG. 40 is an exploded view of the 3-dimensional image revival screen 97 of the seventh embodiment of the present invention.
Figure 41:
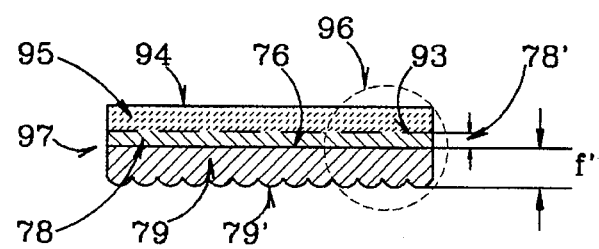
FIG. 41 is a section of the 3-dimensional image revival screen 97 of the seventh embodiment of the present invention.
Figure 42:
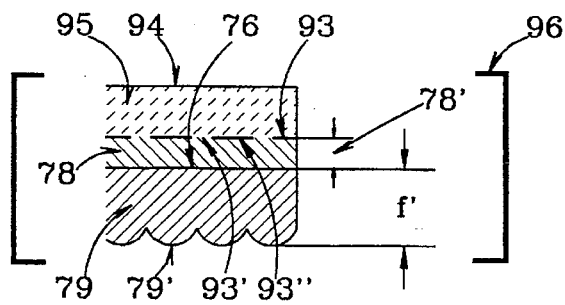
FIG. 42 is a partial enlarged view of the 3-dimensional image revival screen 97 of the seventh embodiment of the present invention.

FIG. 40 is an exploded view of the seventh embodiment 3-dimensional image revival screen 97, where the screen 97 is composed of the first screen 95 having the reflection preventing coating layer 94 on the outer surface opposite to the observer H and formed with the unequal width multiple slit grating 3 or the unequal width multiple holographic slit grating in which the ratio of the width of the transparent portion 93' to the width of the opaque portion 93" is 1:3, the second screen 78 of constant thickness 78' formed with the semitransparent portion 76 on which the image is imaged on the side of the observer H, and the third screen 79 which is lenticular screen composed of the cylindrical lens 79' facing the observer H. The thickness of the third screen 79 is same as the focal length f of the cylindrical lens 79' composing the third screen 79. If these three screens 95, 78 and 79 are brought in contact with each other, the seventh embodiment 3-dimensional image revival screen 97 of the section shown in FIG. 41 results. FIG. 42 is the partial enlarged view of FIG. 41. The reason why the unequal width multiple slit grating 93 or the unequal width multiple holographic slit grating in which the ratio of the width of the transparent portion 93' to the width of the opaque portion 93" is 1:3 is formed on the first screen 95 among the screens composing the seventh embodiment 3-dimensional image revival screen 97 unlike the equal width multiple slit grating 75 or the equal width multiple holographic slit grating, in which the width of the transparent portion 75' is same as the width of the opaque portion 75", formed on the first screen 77 among the screens composing the sixth embodiment 3-dimensional image revival screen 92, the first screen 77 among the screens composing the fifth embodiment 3-dimensional image revival screen 83, and the first screen 77 among the screens composing the fourth embodiment 3-dimensional image revival screen 81 described above, will be described below.

The light source having the image projected on the fourth embodiment 81, the fifth embodiment 83 or the sixth embodiment 3-dimensional image revival screen 92 will be installed one for each left or right image, and when the image information emitted from each left or right light source passes the equal width multiple slit grating 75 or the equal width multiple holographic slit grating, in which the width of the transparent portion 75' is same as the width of the opaque portion 75", formed on the first screen 77 composing the fourth embodiment, fifth embodiment and sixth embodiment 3-dimensional image revival screens, it is resolved into 3-dimensional image informations without deficit or overlap of optical informations, however, if the optical information emitted from the light source having one left and one right images is passed through the unequal width grating in which the width of transparent portion is narrower than the width of opaque portion, then the deficit of the optical information is caused within certain distance within the Fresnel zone in which the collimated beam of light exists, and if the observer observes the 3-dimensional image revived from the image having the deficit of optical information, then it is impossible to see the 3-dimensional image of good quality because black lines appear in the portion having the deficit of optical informations. Therefore, when the unequal width multiple slit grating 93 or the unequal width multiple holographic grating, in which the ratio of the width of the transparent portion 93' to the width of the opaque portion 93" is 1:3, is formed on the first screen 95 among the screens composing the seventh embodiment 3-dimensional image revival screen 97 shown in FIG. 40 and 41, the number of the light sources having the image projected on the seventh embodiment 3-dimensional image revival screen 97 has to be two for each left and right side to avoid deficit of optical information. In the 3-dimensional image revival screen having the first screen as a constituting element formed with the unequal width multiple slit grating or the unequal width multiple holographic slit grating, in which the width of transparent portion is smaller than the width of opaque operation, as 3-dimensional optical information resolving means besides the seventh embodiment 3-dimensional image revival screen 97, there is a relationship as follows between the number of each left and right light sources respectively having the image projected on the screen and the ratio of the width of the transparent portion to the width of the opaque portion of the unequal width multiple slit grating or the unequal width multiple holographic slit grating formed on the first screen. That is, when the number of each of the left and right light sources is 3, the ratio of the width of the transparent portion to the width of the opaque portion of the unequal width multiple slit grating or the unequal width multiple holographic slit grating is 1:5, and when the number is 4, the ratio is 1:7, when the number is 5 the ratio is 1:9, and when the number is 6 the ratio is 1:11. If the relationship between the number of each of the left and right light sources and the ratio of the width of the transparent portion to the width of the opaque portion of the unequal width multiple slit grating or the unequal width multiple holographic slit grating is regularly extended as shown above, the 3-dimensional image revival screen capable of resolving the image emitted from more light sources than above mentioned number into the 3-dimensional optical information can be made. If the relationship is presented by a formula, in the 3-dimensional image revival screen having the first screen as a constituting element formed with the unequal width multiple slit grating or the unequal width multiple holographic slit grating, in which the width of the transparent portion is smaller than the width of opaque portion, as 3-dimensional optical information resolving means, if the number of each of the left and right light sources is taken as y in the relationship between the number of each of left and right light sources respectively having the image projected on the screen and the ratio of the width of the transparent portion to the width of the opaque portion of the unequal width multiple slit grating or the unequal width multiple holographic slit grating formed on the first screen, then the total number of light sources of the left and right light sources is 2y and the ratio of the width of the transparent portion to the width of the opaque portion of the unequal width multiple slit grating or unequal width multiple holographic slit grating formed on the first screen is 1:(2y−1).

Figure 43:
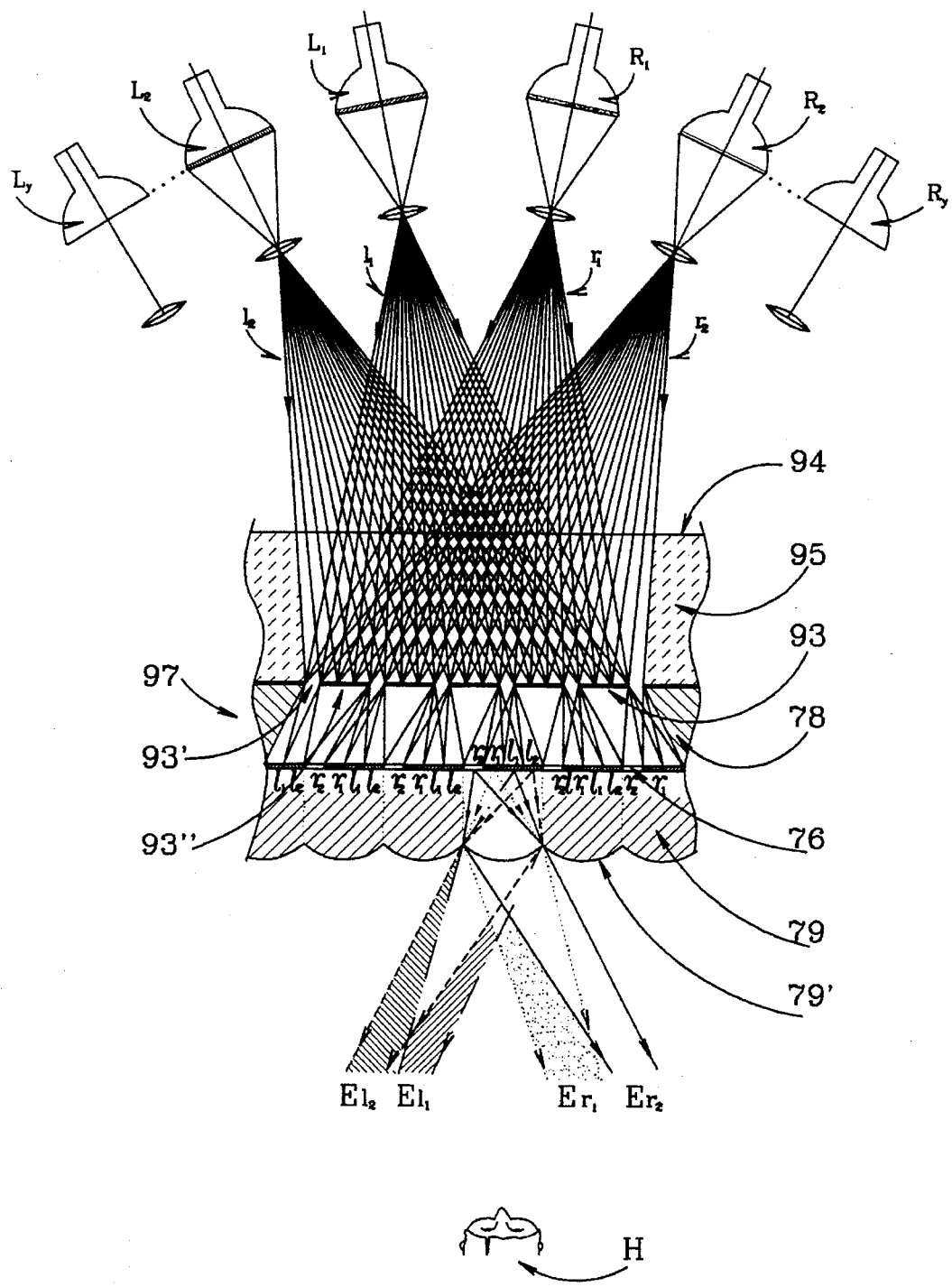
FIG. 43 illustrates a function of revival of a 3-dimensional image of the 3-dimensional image revival screen 97 of the seventh embodiment of the present invention.

FIG. 43 is an enlarged view illustrating the function of the 3-dimensional image revival of the seventh embodiment 3-dimensional image revival screen 97 of the present invention shown in FIG. 41, the function being described below. It provides a method in which the electrical signal of the right two images and left two images photographed by utilizing four cameras apart a certain distance from left to right with respect to the subject or by fitting the prior art stereo photography adapter 2 shown in FIG. 1 to each of two television camera is received by the television receiver and the independent four images can be revived by resolving them into independent two right image and two left image informations. When four images enlarged and collimated after four images $l_2$, $l_1$, $r_1$, $r_2$ independent to each other reproduced by the Braun tubes $L_2$, $L_1$, $R_1$, $R_2$ in the television receiver are passed through each optical system are imaged on the seventh embodiment 3-dimensional image revival screen 97 of the present invention to consist with each other, they are resolved into 3-dimensional optical informations $r_2$, $r_1$, $l_1$, $l_2$ through the equal width multiple slit grating 93 or the equal width multiple holography grating in which the ratio of the width of a transparent portion 93' to the width of an opaque portion 93" is 1:3, arranged vertical to the ground surface and formed on the first screen 95 of the seventh embodiment 3-dimensional image revival screen 97 of the present invention, and are imaged on the semitransparent portion 76 of the second screen 78 without overlap or deficit, then the 3-dimensional optical informations r, r, $El_2$, $El_1$ imaged on the semitransparent portion 76 of the second screen 78 reach the eyes of the observer H through the lenticular screen which is third screen 79 and through the independent two left $El_2$, $El_1$ and two right $Er_1$, $Er_2$ optical paths resulting in images identical with each other but having different optic angles on the retinas of the right and left eyes of the observer H, whereby the transverse parallax and the integrated 3-dimensional feeling are recognized at the optic center of central nerve system of the observer H. If the observer observes the 3-dimensional image revived through the seventh embodiment 3-dimensional image revival screen 97, there is an advantage that the observer can feel the change in the 3-dimensional image according to the angle of observation. And after placing the polarizing filter at the appropriate position of each optical system which the optical informations of the image emitted from each of the left and right light sources, if the observer wears the polarizing glasses in front of the seventh embodiment 3-dimensional revival screen 97, then he can observe the 3-dimensional image.

Figure 44:
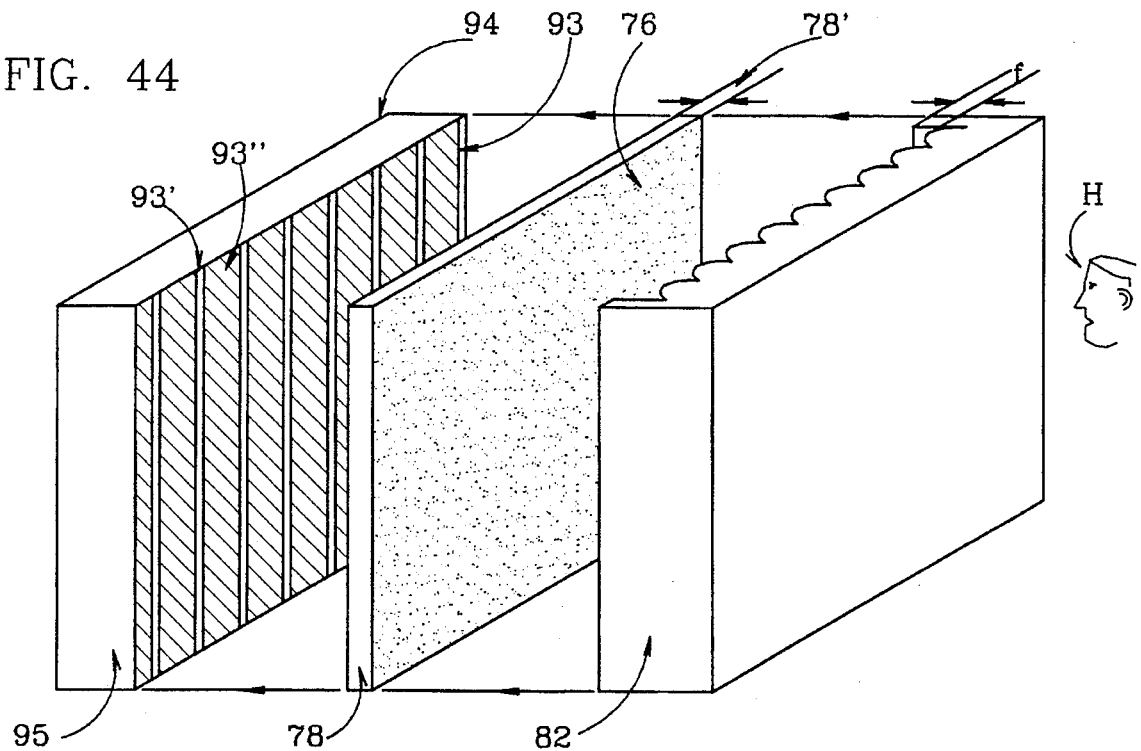
FIG. 44 is an exploded view of the 3-dimensional image revival screen 99 of the eighth embodiment of the present invention.
Figure 45:
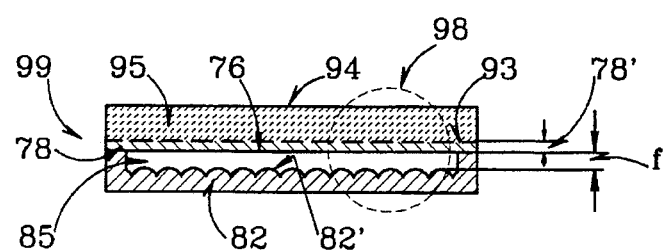
FIG. 45 is a section of the 3-dimensional image revival screen 99 of the eighth embodiment of the present invention.
Figure 46:
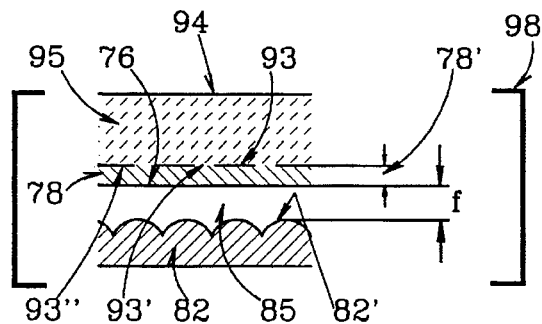
FIG. 46 is a partial enlarged view of the 3-dimensional image revival screen 99 of the eighth embodiment of the present invention.
Figure 47:
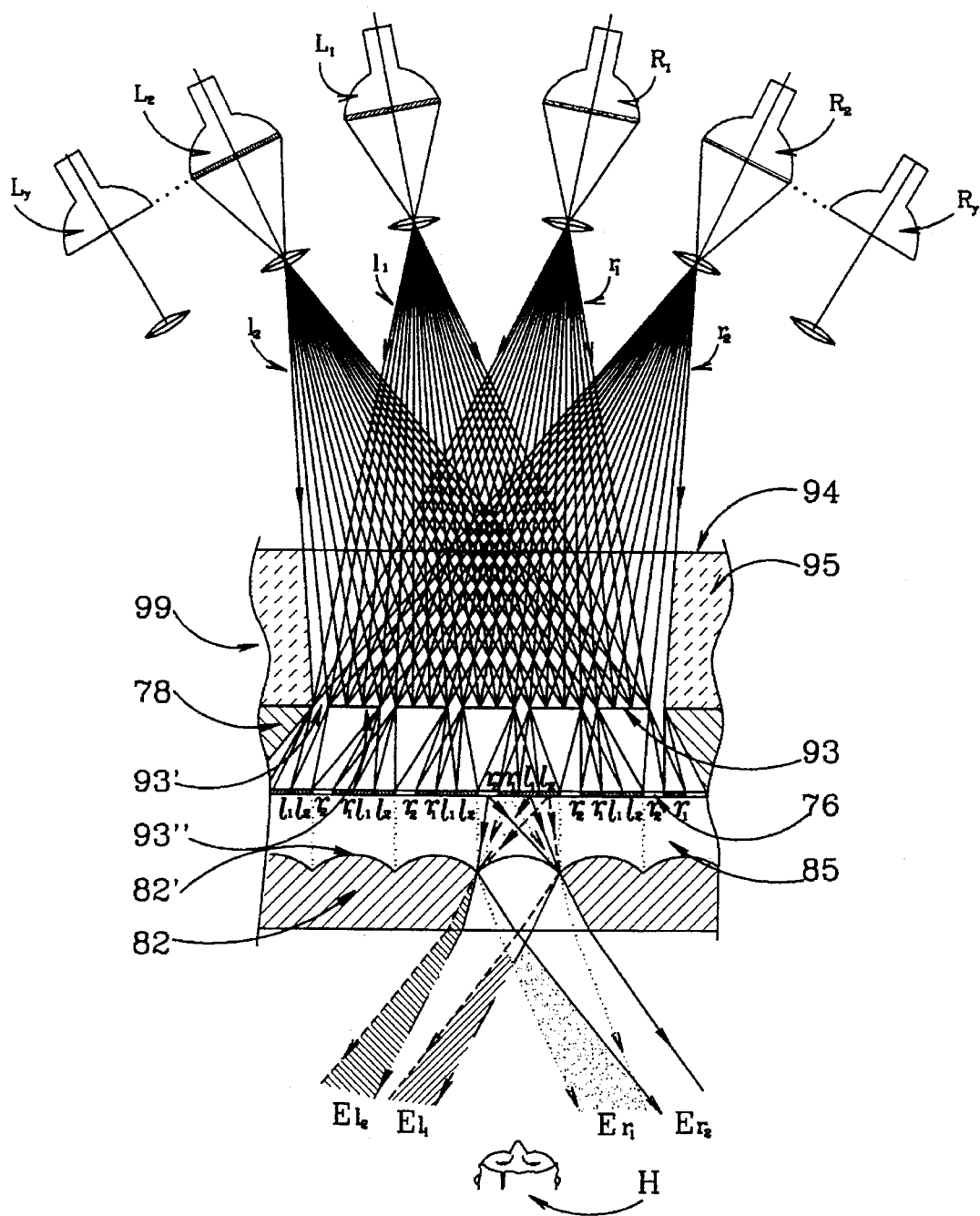
FIG. 47 illustrates a function of revival of a 3-dimensional image of the 3-dimensional image revival screen 99 of the eighth embodiment of the present invention.

FIG. 44 is the exploded view of the eighth embodiment revival screen 99 of the present invention, the technical constitution of it being that the first screen 95 and the second screen 78 are same with the first screen 95 and the second screen 78 in view of the construction shown in FIG. 40, however the fact that the air layer 85 between the second screen 78 and the third screen 82 is constructed as the transmitting media of the 3-dimensional image information is different from FIG. 40. At this time the length f of the air layer between the apex 82' of the cylindrical lens composing the third screen 82 which is lenticular screen and the semitransparent portion 76 of the second screen 78 is made to be same as the focal length of the cylindrical lens composing the third screen 82. The cylindrical lens composing the third screen 82 which is lenticular screen faces the semitransparent portion 76 of the second screen 78. There are advantages that the stable flatness of the screen can be maintained because the thickness of the media composing the third screen 82 can be freely adjusted due to the technical constitution having such characteristics, and the delicate 3-dimensional image can be reproduced because the size and the focal length of the cylindrical lens composing the third screen 82 can be decreased as much as possible. FIG. 45 is the section of the eighth embodiment revival screen 99 formed when the three screens 95, 78 and 82 explained in FIG. 44 are brought in contact with each other. FIG. 46 is a partial enlarged view of FIG. 45. FIG. 47 illustrates the function of the 3-dimensional image revival of the eighth embodiment 3-dimensional image revival screen 99, and the screen 99 performs the same function explained with reference to FIG. 43, whereby the transverse parallax and the integrated 3-dimensional feeling are recognized at the optic center of central nerve system of the observe H.

Figure 48:
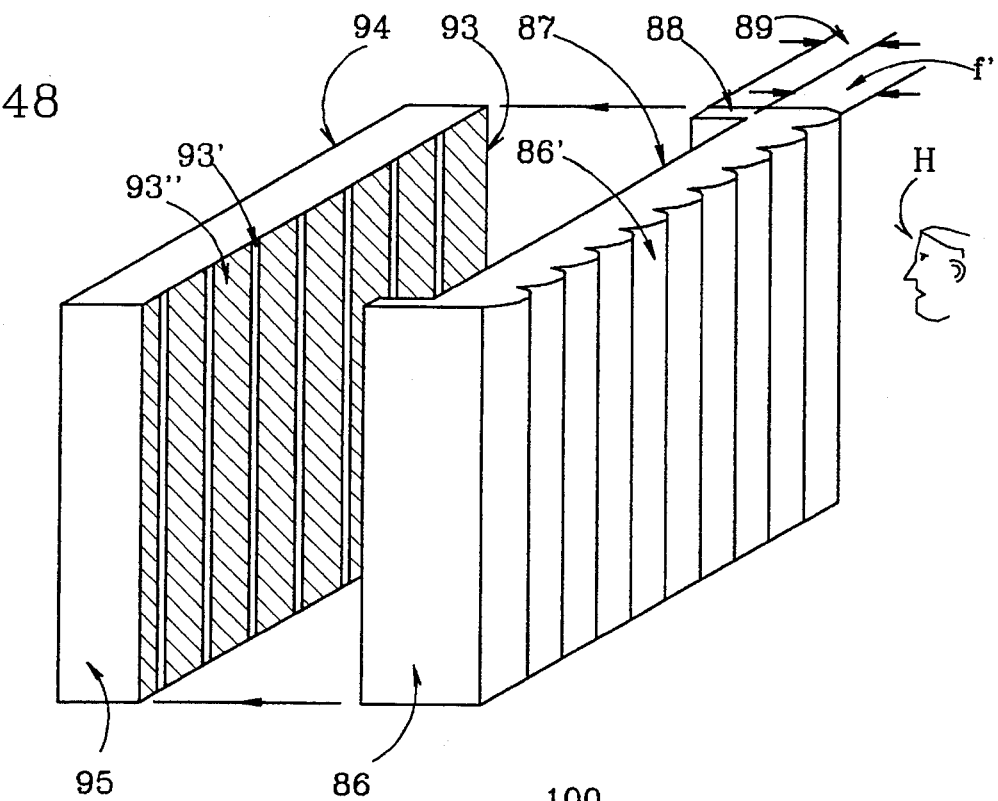
FIG. 48 is an exploded view of the 3-dimensional image revival screen 101 of the ninth embodiment of the present invention.
Figure 49:
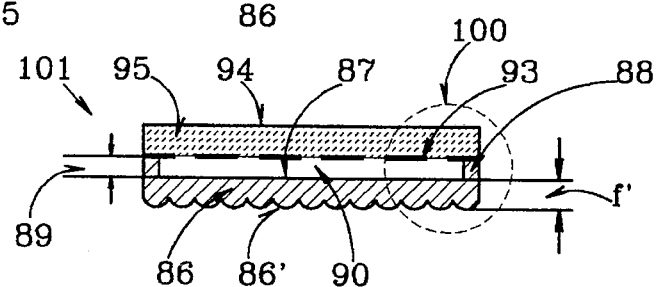
FIG. 49 is a section of the 3-dimensional image revival screen 101 of the ninth embodiment of the present invention.
Figure 50:
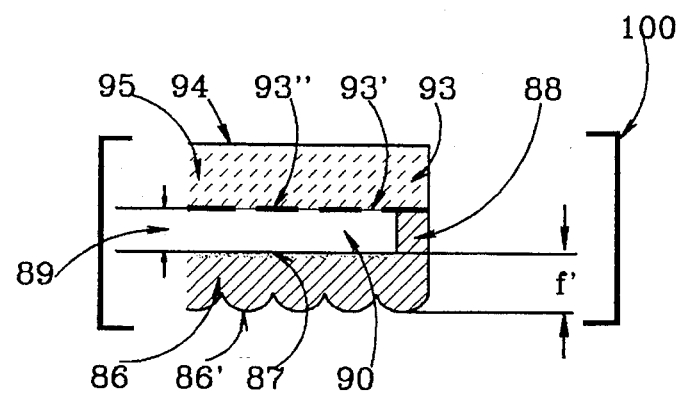
FIG. 50 is a partial enlarged view of the 3-dimensional image revival screen 101 of the ninth embodiment of the present invention.

FIG. 48 is the exploded view of the ninth embodiment revival screen 101 of the present invention, the technical constitution of it being that the first screen 95 is same with the first screen 95 shown in FIG. 40 and the second screen 86 is same with second screen 86 shown in FIG. 36. FIG. 49 is the section of the ninth embodiment 3-dimensional image revival screen 101 formed when the two screens 95, 86 shown in FIG. 48 are brought in contact with each other, and FIG. 50 is a partial enlarged view of FIG. 49.

Figure 51:
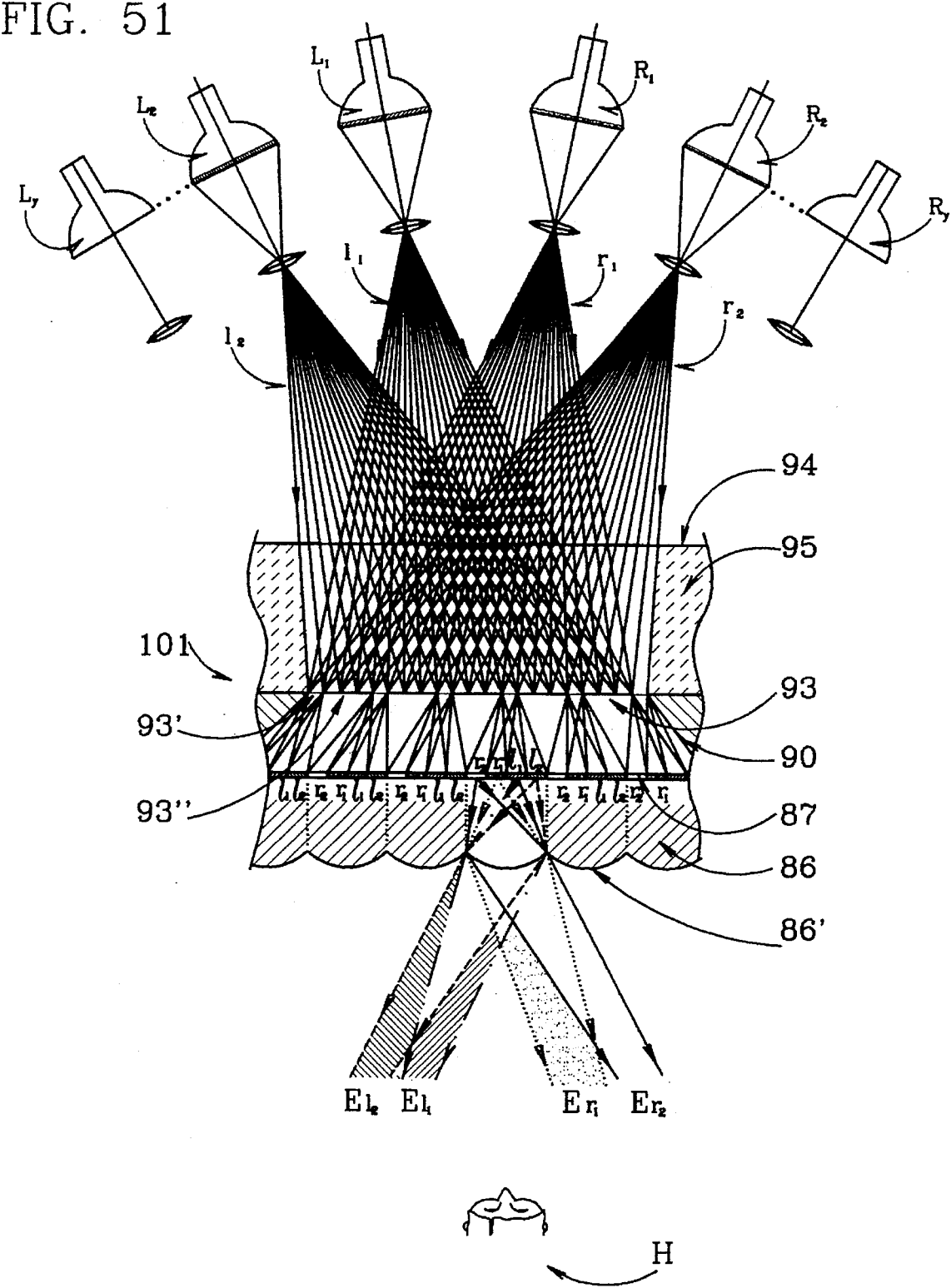
FIG. 51 illustrates a function of revival of a 3-dimensional image of the 3-dimensional image revival screen 101 of the ninth embodiment of the present invention.

FIG. 51 illustrates the function of the 3-dimensional image revival of the ninth embodiment 3-dimensional image revival screen 101, and the screen 101 performs the same function explained with reference to FIG. 43, whereby the transverse parallax and the integrated 3-dimensional feeling are recognized at the optic center of central nerve system of the observer H.

In addition, the 3-dimensional movie can be revived by utilizing the fourth 81, fifth 83 and sixth embodiment 3-dimensional image revival screen 92 of the present invention.

Figure 52:
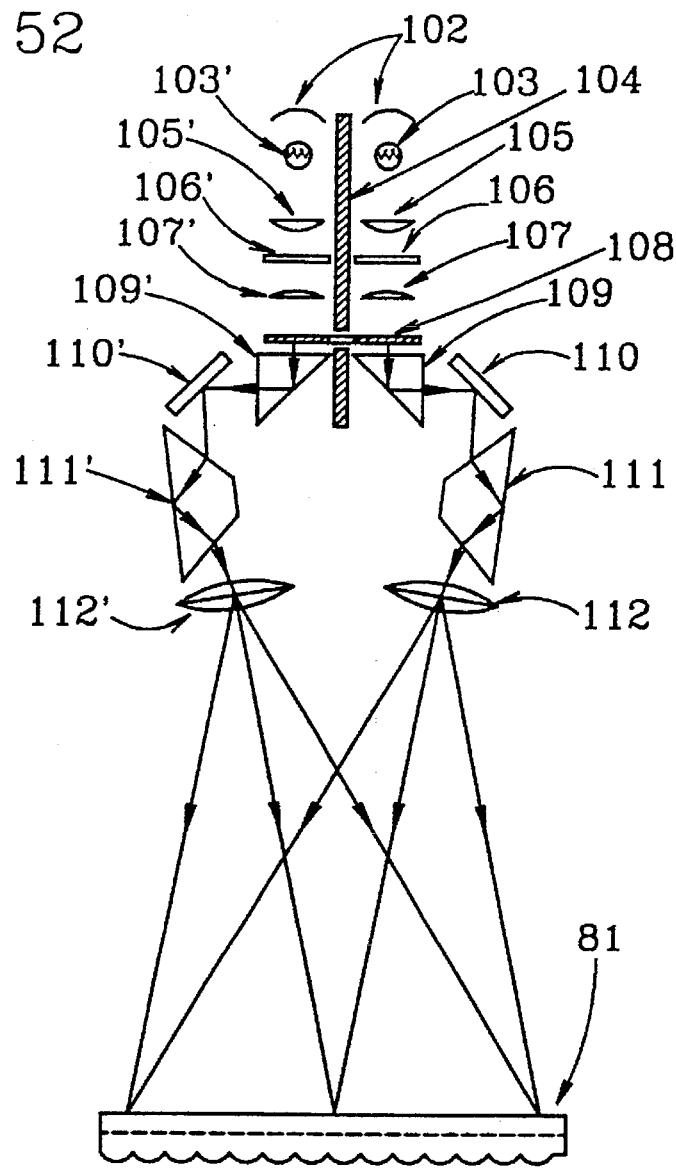
FIG. 52 is a second embodiment of the 3-dimensional movie of the present invention utilizing the 3-dimensional image revival screen 81 of the fourth embodiment of the present invention.

FIG. 52 illustrates the technical constitution of revival of the 3-dimensional movie. If each of the left and right image informations emitted form the image r, l produced on the film by scanning the light, passed through the light collecting optical system including the aspherical lens 105, 105' starting from the light sources 103, 103', on the positive film 108 photographed of two images, that is, the right image r and the left image l on the film of one frame per one subject by fitting the known stereo adaptor 2 shown in FIG. 1, is changed in its optical path to the opposite direction through the rectangular prism 109, 109', is reflected at the mirrors 110, 110', is passed through the dove prism 111, 111', and is enlarged and imaged on the fourth embodiment 3-dimensional image revival screen 81 through the optical system 112, 112' to consist with each other, then the 3-dimensional image appears through the fourth embodiment 3-dimensional image revival screen 81.

Figure 53:
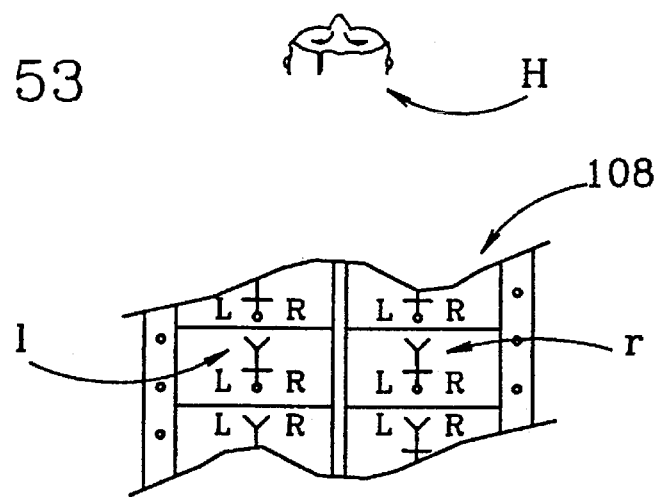
FIG. 53 is an example of a positive film 108 photographed of two images, that is, right image r and left image l on a film of one frame.

FIG. 53 shows the positive film taken of the right r and left l two images on one film of one frame.

FIG. 54 is an another embodiment of revival of the 3-dimensional movie, where each of the left and right image informations emitted by scanning the light from the light source 115, 115' to the positive film 120 photographed of the right r and the left l two images on the film of one frame after the light passes through the light collecting optical system including the aspherical lens 117, 117' is passed through the rectangular prism 121, 121', the mirror 122, 122' and the optical system 123, 123', then reflected at the mirror 124, 124', and then enlarged and projected on the fourth embodiment 3-dimensional image revival screen 81 to consist with each other.

Figure 55:
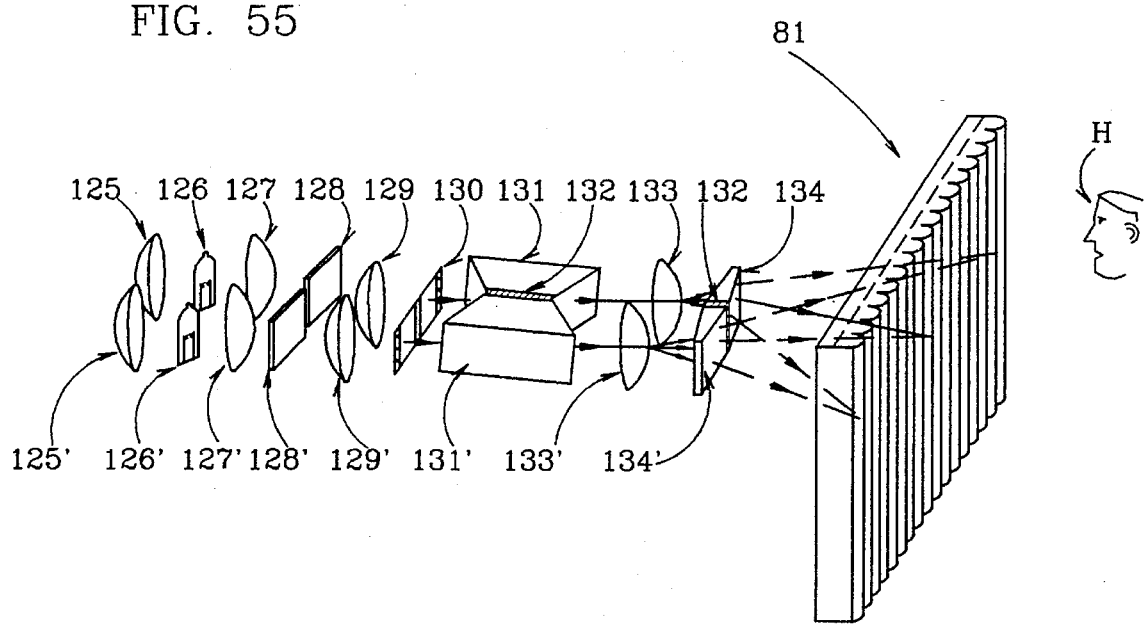
FIG. 55 is a fourth embodiment of the 3-dimensional movie of the present invention utilizing the 3-dimensional image revival screen 81 of the fourth embodiment of the present invention.
Figure 56:
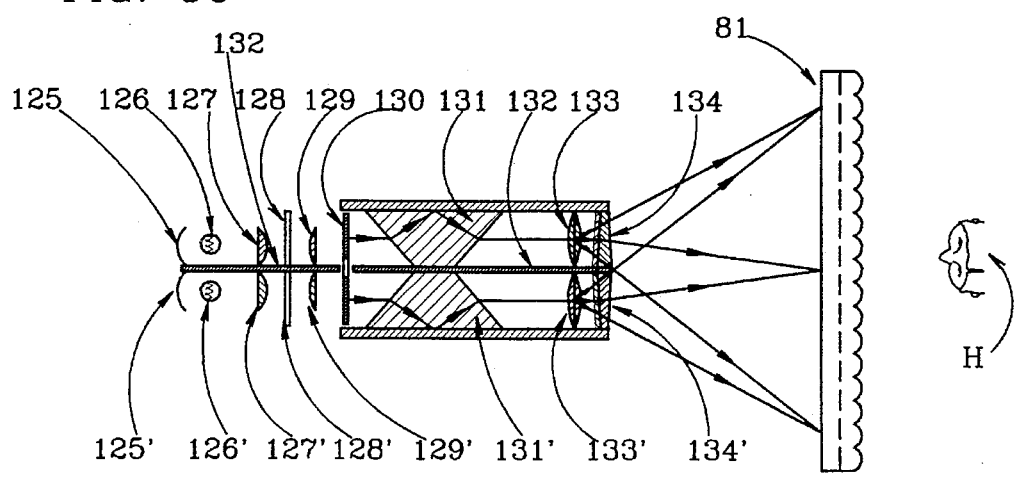
FIG. 56 is a section of FIG. 55.

FIG. 55 is an another embodiment of revival of the 3-dimensional movie, where each of the left and right image informations emitted by scanning the light from the light source 126, 126' to the positive film 130 photographed of the right r and the left l two images on the film of one frame after the light passes through the light collecting optical system including the aspherical lens 127, 127' is passed through the dove prism 131, 131' so that each of the left l and right r images taken on the positive film is reversed in its left and right, then passed through the optical system 133, 133' and the thin prism or Herschel prism 134, 134', and then enlarged and projected on the fourth embodiment 3-dimensional image revival screen 81 consist with each other. FIG. 56 is the section of the embodiment of FIG. 55. As a screen for revival of the 3-dimensional movie as explained in FIGS. 52, 54 or 55, the fifth embodiment 83 or the sixth embodiment 3-dimensional image revival screen 92 instead of the fourth embodiment 3-dimensional image revival screen 81 can be used to realize the 3-dimensional movie. In addition, in these cases of 3-dimensional movie, the light shielder 104, 116 and 132 must be installed in the projector to prevent the mixing of the right image r and the left image l in the projector. In the 3-dimensional image revival devices such as the 3-dimensional movie or 3-dimensional television receiver using the fourth embodiment 81, the fifth embodiment 83, or the sixth embodiment 3-dimensional revival screen 92, if the polarizing filter is fitted at the appropriate position next to the Braun tube in the 3-dimensional television receiver or the film on which the right image r and the left image l are recorded, and if the observer wears the polari glasses in front of the fourth embodiment 81, the fifth embodiment 83, or the sixth embodiment 3-dimensional image revival screen 92, then the observer can also see the 3-dimensional movie. The 3-dimensional image can be realized with an O.H.P. in the same method as the method of reviving the 3-dimensional movie. If the positive films recorded with the right image r and the left image l photographed of one subject in the directions in which the left optical angle and the right optical angle are different from each other are respectively independently enlarged and projected on the fourth embodiment 81, the fifth embodiment 83, or the sixth embodiment 3-dimensional image revival screen 92 through the optical system of O.H.P. to consist with each other, then the 3-dimensional image can be revived.

FIG. 57 is a section of 3-dimensional liquid crystal television receiver 143 with the exception of electronic devices, where the receiver 143 is a device which receives the 3-dimensional image information converted into electrical signal which was transmitted by converting the image photographed using the 3-dimensional television camera or video camera shown in FIG. 14 into electrical signal, and revives it again into the 3-dimensional image, and the structure of the receiver 143 is composed of the liquid crystal panel 136', the air layer 139 and the lenticular screen 141, the liquid crystal panel 136' being composed of the image generating portion 135 and the transparent medium 136, and the lenticular screen 141 being composed of the cylindrical lens 140 facing the liquid crystal panel 136' and formed with the flat plane 142 to the outside, that is, to the observer H and there is the air layer 139 between the front surface 137 of the liquid crystal panel 136' and the lenticular screen 141, and at this time, the distance 138 between the apex of the cylindrical lens 140 composing the lenticular screen 141 and the image generating portion 135 of the liquid crystal panel 136' including the air layer 139 is same as the focal length of the cylindrical lens 140 composing the lenticular screen 141.

Figure 58:
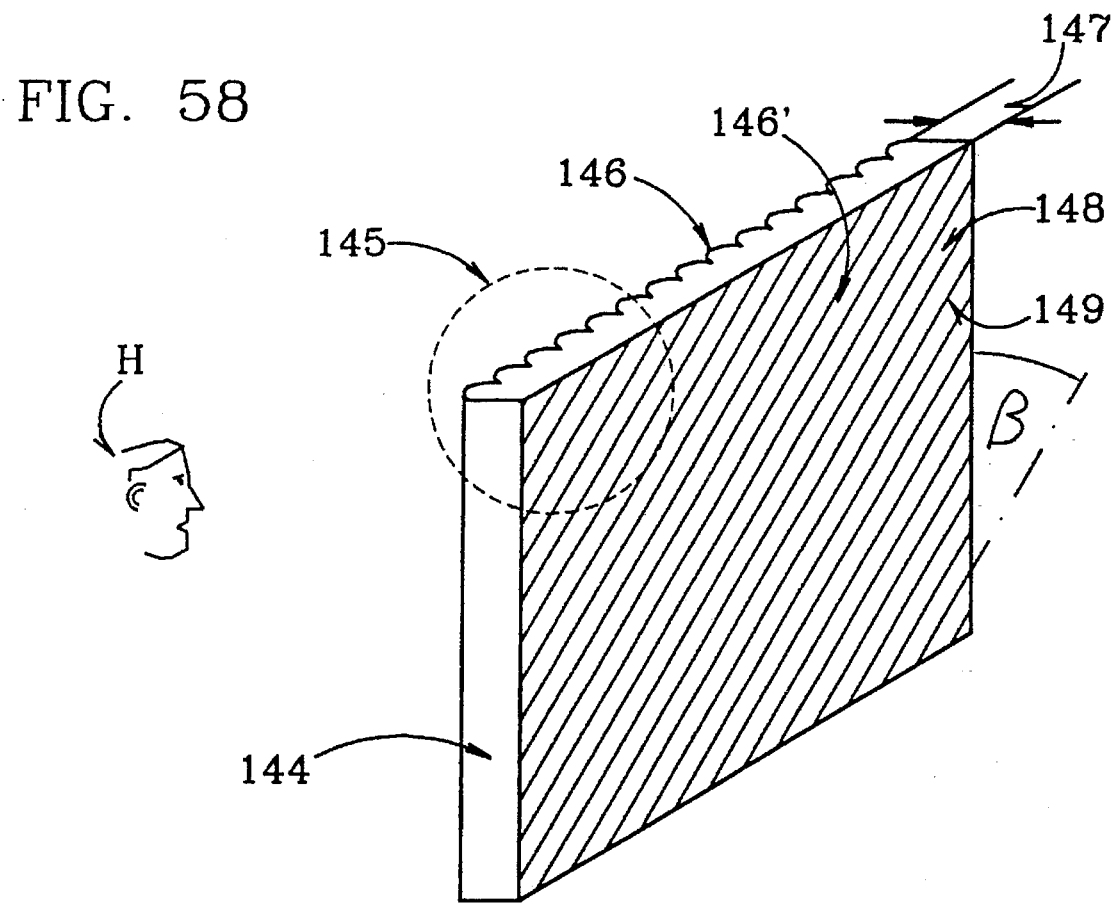
FIG. 58 is a perspective view of a multiple slit grating which is a reducing means of the reversed distance of the 3-dimensional image, in which grating the transparent portions and the opaque portions of the same width are arranged alternately, and which grating is formed on a focal plane 146' of the lenticular screen 144 in the form of oblique lines.
Figure 59:
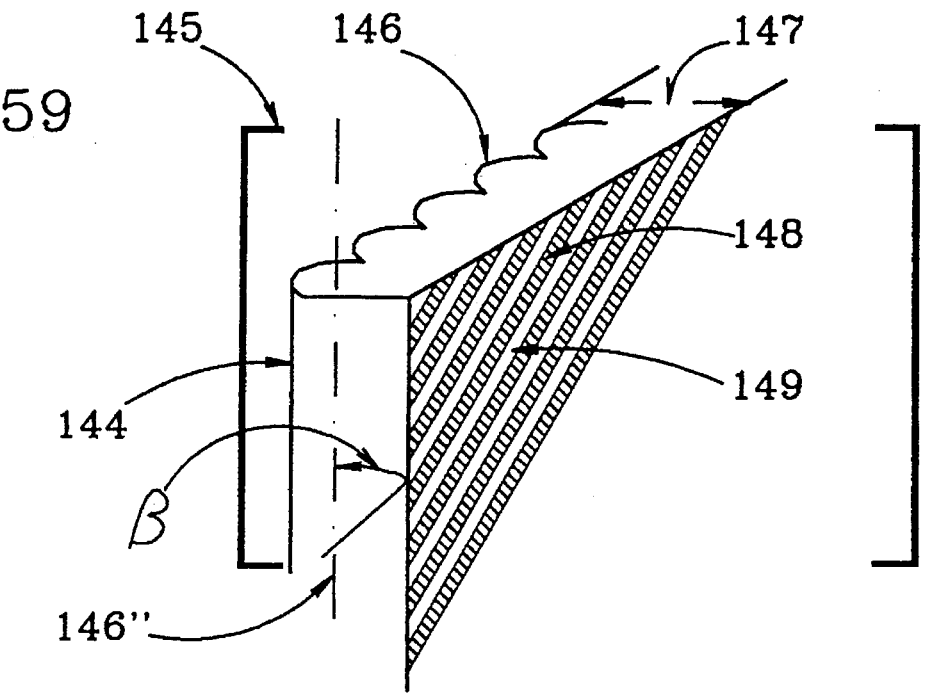
FIG. 59 is a partial enlarged view of FIG. 58.

In the 3-dimensional image revived at each of the first embodiment 3-dimensional image revival screen 61 shown in FIG. 22, the second embodiment 3-dimensional image revival screen 62 shown in FIG. 23, the third embodiment 3-dimensional image revival screen 68 shown in FIG. 24, the fourth embodiment 3-dimensional image revival screen 81 shown in FIG. 28, the fifth embodiment 3-dimensional image revival screen 83 shown in FIG. 32, the sixth embodiment 3-dimensional image revival screen 92 shown in FIG. 36, the seventh embodiment 3-dimensional image revival screen 97 shown in FIG. 40, the eight embodiment 3-dimensional image revival screen 99 shown in FIG. 44, and the ninth embodiment 3-dimensional image revival screen 101 shown in FIG. 48, the phenomenon of reversed distance different from the actual distance sometimes arises, and the reducing means of reversed distance is used in the present invention to reduce such phenomenon. The reducing means of reversed distance is shown in FIGS. 58 and 59, where the multiple slit grating in which the width of the transparent portion 148 and the width of the opaque portion 149 are same with each other is formed in the form of oblique lines, which are inclined a certain angle β to the longitudinal axis 146" of the cylindrical lens 146 on the lenticular screen 144, on the focal plane 146' at the focal length 147 of the cylindrical lens 146 formed on one side of the lenticular screen 144 which is one of the portions composing the second embodiment 3-dimensional image revival screen 62 shown in FIG. 23, the third embodiment 3-dimensional image revival screen 68 shown in FIG. 24, the fourth embodiment 3-dimensional image revival screen 81 shown in FIG. 28, the sixth embodiment 3-dimensional image revival screen 92 shown in FIG. 36, the seventh embodiment 3-dimensional image revival screen 97 shown in FIG. 40 or the ninth embodiment 3-dimensional image revival screen 101 shown in FIG. 48.

Figure 60:
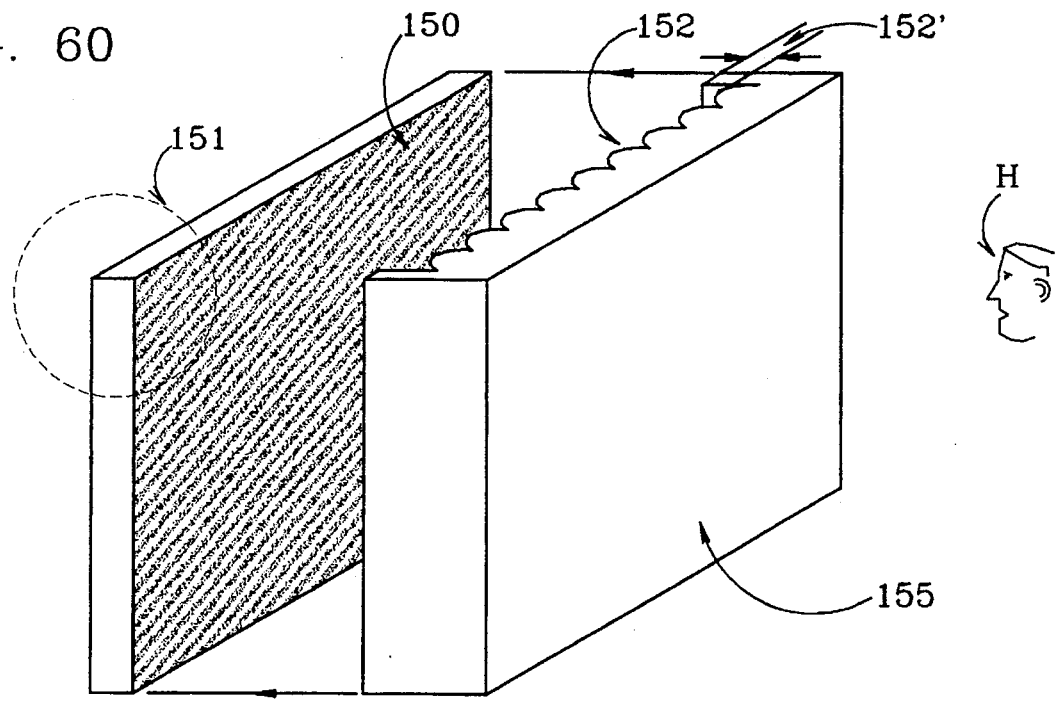
FIG. 60 is a perspective view of a multiple slit grating which is a reducing means of the reversed distance of the 3-dimensional image, in which grating the transparent portions and the opaque portions of the same width are arranged alternately, and which grating is formed on a semitransparent image plane 150 in the form of oblique lines.
Figure 61:
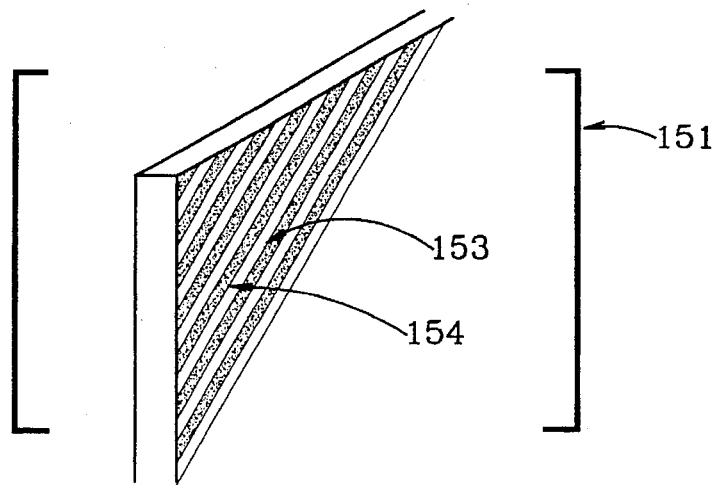
FIG. 61 is a partial enlarged view of FIG. 60.

In FIGS. 60 and 61, other embodiment of the reducing means of reversed distance is shown, where reducing effect can be obtained by forming the multiple slit grating, in which the width of the transparent portion 154 and the width of the opaque portion 153 are same with each other, in the form of oblique lines, which are inclined a certain angle to the longitudinal axis of the cylindrical lens 152 on the lenticular screen 155, on the semitransparent image plane 150 at the focal length 152' of the cylindrical lens 152 facing opposite to the observer H. As a result, the transparent portion 154 of the multiple slit grating formed at the semitransparent image plane 150 remains as the semitransparent image plane 150. This is an embodiment used in the case of the first embodiment 3-dimensional image revival screen 61 shown in FIG. 22, the fifth embodiment 3-dimensional image revival screen 83 shown in FIG. 32, or the eighth embodiment 3-dimensional image revival screen 99 shown in FIG. 44.

By utilizing the technology of the present invention reviving the 3-dimensional image, it is possible to display the situation similar to the actual situation in the practice of the operation of the airplane or in the practice of the operation of the car so that the learner can learn the technique sufficiently in the safe condition, add it is also possible to apply the present invention to the field of the electronic game machine with minor modification. The application of the 3-dimensional projection method to the 3-dimensional slide projector or the 3-dimensional O.H.P. belongs to the scope of the present invention, and because anyone skilled in the field of the present technology can perform a variety of modification of the present invention, a variety of the modification, alteration or change within the present invention belongs to the spirit and the scope of the claims described below. The present invention is composed of a group of inventions to realize the 3-dimensional image, and all of the present invention make the development from the planar image to the 3-dimensional image possible in the field of photography, movie and television industry by simple modification to the prior art devices. Here, the important thing in the present invention is that in the relationship between the number y of each of right and left incident holes of light in the 3-dimensional image photographer for a subject or the number y of each of right and left image light sources photographed by the 3-dimensional photographer and the ratio of the width of the transparent portion to the width of the opaque portion in the multiple slit grating which is the 3-dimensional optical information resolving means, as far as the ratio of the width of the transparent portion to the width of the opaque portion of the multiple slit grating which is the 3-dimensional optical information resolving means satisfies $1:(2y-1)$, the width of the transparent portion and the width of the opaque portion of the multiple slit grating which is the 3-dimensional optical information resolving means do not have to be the same in all the above said inventions through the present specification. That is, although it was stated that there is no deficit or overlap in the condition in which the information resolved into the 3-dimensional image through the multiple slit grating images the right image and the left image on one image plane only when the width of the transparent portion and the width of the opaque portion are the same for the multiple slit grating which is the 3-dimensional optical information resolving means in the 3-dimensional photography, 3-dimensional image photographer or 3-dimensional image revival screen, when y is taken as the number of left incident holes of light of the 3-dimensional image photographer for a subject for the development of the logic of the present specification, and as the number of right incident holes of light, or as the number of left image light sources photographed by the 3-dimensional image photographer, and as the number of right image light sources, if $y=1$, then the total number of the incident holes of light of the 3-dimensional image photographer is two or the total number of the image light source photographed by the 3-dimensional image photographer is two, and accordingly the ratio of the width of the transparent portion to the width of the opaque portion of the multiple slit grating which is the 3-dimensional optical information resolving means becomes 1:1. That is, because the logic of the present specification is developed based on the premises of two incident holes of light or two image light sources totaling one left incident hole of light and one right incident hole of light of the 3-dimensional image photographer for one subject, or totaling one left image light source and one right image light source photographed by the 3-dimensional image photographer, when, in general, y is taken as the number of left incident holes of light of the 3-dimensional image photographer for a subject and as the number of right incident holes of light, or as the number of left image light sources and as the number of right image light sources, the widths of the transparent portion and the opaque portion of the multiple slit grating which is the 3-dimensional image information resolving means, the total number of the incident holes of light or the total number of image light sources are determined according to the expansion of the number y of the incident holes of light of one side or the number y of the image light sources of one side until it is expanded to any arbitrary number more or equal to 1. Therefore, it is obvious that the fact that there is no deficit or overlap of image information in the condition that the right image and the left image of the 3-dimensional image information resolved by the multiple slit grating are imaged on one image plane only when the widths of the transparent portion and the opaque portion of the multiple slit grating which is the 3-dimensional image information resolving means are equal to each other is a part of the present invention. A 3-dimensional image advertising board can be constructed by projecting the 3-dimensional positive film recorded with the 3-dimensional image information on the 3-dimensional image revival screen or by placing an lighting devices behind the photograph recorded with the 3-dimensional image information by utilizing the photograph recorded with the 3-dimensional image information of the present invention, and the 3-dimensional image information recording medium which records by converting into some form of signals or codes the 3-dimensional image information made through the 3-dimensional image information recording method of the present invention falls into the scope of the present invention. Also, realizing the present invention is very easy and will cause great changes and give contribution to the industrial development.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

What is claimed is:

1. A method for resolving 3-dimensional optical information, in recording 3-dimensional image information, comprising the steps of:

passing optical information of a subject through a light shielder with left and right transparent portions defined therein that are arranged vertical to a ground surface;

collimating said optical information through an optical system;

passing said optical information through a multiple slit grating having a selected number y of transparent portions and opaque portions defining a Fresnel zone, and which grating is arranged vertical to the ground surface, thereby resolving said image information into a number 2y of 3-dimensional image information $r_1, r_2, r_3 \ldots r_y, l_1, l_2, l_3 \ldots l_y$, the $r_1, r_2, r_3 \ldots r_y$ image information being from the right and the $l_1, l_2, l_3 \ldots l_y$ image information being from the left transparent portions of the light shielder; and producing an image without deficit or overlap of a number y of the 3-dimensional image information $r_1, r_2, r_3 \ldots r_y$, and a number y of 3-dimensional image information $l_1, l_2, l_3 \ldots l_y$, with a sequence of $l_1, r_1, l_2, r_2 \ldots l_y, r_y$ on an image plane positioned within the Fresnel zone behind the multiple slit grating.

2. An apparatus for resolving 3-dimensional optical information, in recording 3-dimensional image information, comprising:

a light shielder with left and right transparent shielder portions which are arranged vertical to a ground surface;

an optical system through which said optical information is collimated;

a multiple slit grating having opaque portions and a number y transparent grating portions defining a Fresnel zone behind the grating, said transparent grating portions being arranged vertical to the ground surface, said transparent grating portions resolving said image information into a number 2y of 3-dimensional image information $r_1, r_2, r_3 \ldots r_y, l_1, l_2, l_3 \ldots l_y$; and an image plane positioned within the Fresnel zone behind the multiple slit grating, on which an image without deficit or overlap is produced with a sequence of $l_1, r_1, l_2, r_2, \ldots l_y, r_y$.

3. The apparatus for resolving 3-dimensional optical information, in recording 3-dimensional image information as claimed in claim 2, wherein the transparent portions and the opaque portions of said multiple slit grating are of equal and uniform width.

4. A 3-dimensional camera for recording 3-dimensional image information, comprising:

a light shielder with and left and right transparent portions which are arranged vertical to a ground surface;

an optical system for collimating optical information emitted by a subject;

a resolving means placed behind said optical system and resolving the collimated optical information into 3-dimensional optical information for realizing again a 3-dimensional image, the resolving means having a Fresnel zone; and a film installed at an image plane placed within the Fresnel zone behind said resolving means.

5. The 3-dimensional camera as claimed in claim 4, wherein said resolving means is a multiple slit grating arranged vertical to the ground surface.

6. The 3-dimensional camera as claimed in claim 5, wherein said multiple slit grating has alternately spaced transparent and opaque portions that are of equal width.

7. The 3-dimensional camera as claimed in claim 5, wherein said resolving means is a holographic slit grating.

8. The 3-dimensional camera as claimed in claim 5, wherein said light shielder has more than three transparent portions and wherein said multiple slit grating has transparent grating portions and opaque portions which are arranged alternately with the ratio 1:(2y−1) of each width of the transparent portions to each width of the opaque portions.

9. A method for recording 3-dimensional optical information comprising the steps of:

passing optical information of a subject through a light shielder with left and right transparent portions, the light shielder being arranged vertical to a ground surface;

collimating said optical information of said subject through an optical system;

passing said optical information through a 3-dimensional optical information resolving means having a Fresnel zone to resolve into 3-dimensional optical information; and realizing a 3-dimensional image on a film placed at a certain distance within the Fresnel zone behind said 3-dimensional optical information resolving means.

10. The method for recording 3-dimensional optical information as claimed in claim 9, wherein said resolving means is a multiple slit grating arranged vertical to a ground surface.

11. The method for recording a 3-dimensional optical information as claimed in claim 10, wherein said multiple slit grating has transparent portions and opaque portions, the transparent portions and the opaque portions being equal in width and being alternately spaced.

12. The method for recording 3-dimensional optical information as claimed in claim 10, wherein said resolving means is a holographic slit grating.

13. The method for recording 3-dimensional optical information as claimed in claim 10, wherein said light shielder has more than three transparent portions and wherein said multiple slit grating has transparent portions and opaque portions which are arranged alternately with the ratio 1:(2y−1) of each width of the transparent portions to each width of the opaque portions.

14. An apparatus for resolving 3-dimensional optical information, in recording 3-dimensional image information, comprising:

a light shielder having left and right transparent shielder portions, the transparent shielder portions being arranged vertical to a ground surface, the left and right transparent portions each being y in number;

an optical system through which said optical information is refracted;

a multiple slit grating having transparent portions each with a first width and opaque grating portions each with a second width, the ratio of said first width to said second width being 1:(2y−1), said opaque and transparent grating portions being arranged vertical to the ground surface, each of said transparent grating portions resolving said image information into a number 2y of 3-dimensional image information; and an image plane positioned behind the multiple slit grating on which an image without deficit or overlap is produced.

* * * * *